(12) United States Patent
Yagi

(10) Patent No.: US 11,934,511 B2
(45) Date of Patent: Mar. 19, 2024

(54) INFORMATION PROCESSING DEVICE AND INFORMATION PROCESSING SYSTEM

(71) Applicants: Kabushiki Kaisha Toshiba, Tokyo (JP); Toshiba Infrastructure Systems & Solutions Corporation, Kawasaki (JP)

(72) Inventor: Yusuke Yagi, Narashino (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 447 days.

(21) Appl. No.: 17/226,138

(22) Filed: Apr. 9, 2021

(65) Prior Publication Data

US 2021/0256109 A1   Aug. 19, 2021

Related U.S. Application Data

(63) Continuation of application No. PCT/JP2019/039279, filed on Oct. 4, 2019.

(30) Foreign Application Priority Data

Oct. 12, 2018   (JP) ................. 2018-193538

(51) Int. Cl.
*G06F 21/44* (2013.01)
*G06F 13/40* (2006.01)
(Continued)

(52) U.S. Cl.
CPC .......... *G06F 21/44* (2013.01); *G06F 13/4068* (2013.01); *G06F 21/602* (2013.01); *G06F 21/755* (2017.08); *G06F 21/85* (2013.01)

(58) Field of Classification Search
CPC .... G06F 21/44; G06F 21/755; G06F 13/4068; G06F 21/602; G06F 21/85
See application file for complete search history.

(56) References Cited

U.S. PATENT DOCUMENTS

2003/0204720 A1* 10/2003 Schoen ................. H04L 51/04
713/153
2005/0120231 A1*  6/2005 Harada ................. G06F 21/577
713/189

(Continued)

FOREIGN PATENT DOCUMENTS

EP    2 043 303 A1    4/2009
JP    2005-151132 A    6/2005

(Continued)

OTHER PUBLICATIONS

International Search Report dated Dec. 10, 2019 in PCT/JP2019/039279 filed on Oct. 4, 2019, 4 pages (with English Translation).

*Primary Examiner* — Stephen T Gundry
(74) *Attorney, Agent, or Firm* — Maier & Maier, PLLC

(57) ABSTRACT

An information processing device includes a first communication unit, a second communication unit, an information processing unit, and a switching unit. The information processing unit is configured to encrypt information which is received from a terminal device and to transmit the encrypted information to a network and configured to decrypt information which is received from the network and to transmit the decrypted information to the terminal device. The information processing device includes a switching unit configured to directly connect a communication line between the first communication unit and the terminal device to another communication line between the second communication unit and the network, when the information processing unit comes into an inoperable state including at least electric power supply stop state, and to switch into a (Continued)

pass-through mode in which the terminal device and the network communicate directly with each other without through the information processing unit.

8 Claims, 14 Drawing Sheets

(51) Int. Cl.
*G06F 21/60* (2013.01)
*G06F 21/75* (2013.01)
*G06F 21/85* (2013.01)

(56) References Cited

U.S. PATENT DOCUMENTS

| | | | | |
|---|---|---|---|---|
| 2008/0022090 | A1* | 1/2008 | Kishimoto | H04N 1/00464 |
| | | | | 713/156 |
| 2010/0091663 | A1* | 4/2010 | Takeyama | H04L 49/602 |
| | | | | 370/242 |
| 2015/0172506 | A1* | 6/2015 | Nishiyama | H04N 1/3263 |
| | | | | 358/1.14 |
| 2019/0042800 | A1* | 2/2019 | Desai | G06F 13/20 |
| 2019/0213334 | A1* | 7/2019 | Sakamoto | H04B 10/27 |
| 2019/0236270 | A1* | 8/2019 | Yamane | G06F 21/55 |
| 2019/0273733 | A1* | 9/2019 | Kawabata | G06F 21/31 |
| 2019/0289039 | A1* | 9/2019 | Kamiya | H04L 63/0823 |
| 2019/0334889 | A1* | 10/2019 | Ito | H04L 63/0853 |
| 2019/0379655 | A1* | 12/2019 | Todoroki | H04L 9/0819 |
| 2020/0204992 | A1* | 6/2020 | Sawaki | H04M 11/00 |
| 2020/0304341 | A1* | 9/2020 | Hayashi | H04L 63/0227 |
| 2020/0358763 | A1* | 11/2020 | Kii | H04L 63/0442 |
| 2021/0050997 | A1* | 2/2021 | Nakatsuru | G06F 21/606 |
| 2021/0249145 | A1* | 8/2021 | Futamura | H04L 9/3273 |
| 2021/0399891 | A1* | 12/2021 | Fukushima | H04W 12/06 |
| 2022/0385655 | A1* | 12/2022 | Tomoeda | H04L 63/0853 |

FOREIGN PATENT DOCUMENTS

| | | |
|---|---|---|
| JP | 2009-117887 A | 5/2009 |
| JP | 2015-119315 A | 6/2015 |
| JP | 2016-192176 A | 11/2016 |
| JP | 2018-042081 A | 3/2018 |
| JP | 2018-078518 A | 5/2018 |
| WO | WO 2008/004617 A1 | 1/2008 |
| WO | WO 2008/114777 A1 | 9/2008 |

* cited by examiner

FIG. 3

| PARAMETER NAME | | PARAMETER VALUE | COMMUNICATION RISK |
|---|---|---|---|
| COMMUNICATION RESULT | NUMBER OF TIMES OF AUTHENTICATION | LESS THAN 100 | HIGH |
| | | EQUAL TO OR GREATER THAN 100 AND LESS THAN 5000 | MIDDLE |
| | | EQUAL TO OR GREATER THAN 5000 | LOW |
| | AMOUNT OF COMMUNICATION DATA | EQUAL TO OR GREATER THAN 1 GB | HIGH |
| | | EQUAL TO OR GREATER THAN 100 MB AND LESS THAN 1 GB | MIDDLE |
| | | LESS THAN 100 MB | LOW |
| | CONTINUOUS COMMUNICATION PERIOD | LESS THAN 10 DAYS | HIGH |
| | | EQUAL TO OR GREATER THAN 10 DAYS AND LESS THAN 100 DAYS | MIDDLE |
| | | EQUAL TO OR GREATER THAN 100 DAYS | LOW |
| | ... | ... | ... |
| ENVIRONMENTAL PARAMETER | ESTIMATED RESTORATION TIME | EQUAL TO OR GREATER THAN 60 MINUTES | HIGH |
| | | EQUAL TO OR GREATER THAN 10 MINUTES AND LESS THAN 60 MINUTES | MIDDLE |
| | | LESS THAN 10 MINUTES | LOW |
| | NETWORK ENVIRONMENT | PUBLIC COMMUNICATION NETWORK | HIGH |
| | | IN-HOUSE LAN | MIDDLE |
| | | LAN IN SPECIFIC AREA | LOW |
| | ... | ... | ... |
| ... | ... | ... | ... |

FIG. 4

| DEVICE ID | COMMUNICATION ENVIRONMENT | |
|---|---|---|
| M0001 | COMMUNICATION MODE | SSL |
| | AUTHENTICATION METHOD | HTTP/FTP |
| | DEVICE INFORMATION | XX:XX:XX:XX:XX:XX |
| | ESTIMATED RESTORATION TIME | 20 MINUTES |
| | NETWORK ENVIRONMENT | IN-HOUSE LAN |
| | ... | ... |
| ... | ... | ... |

FIG. 5

| DEVICE ID | COMMUNICATION RESULT INFORMATION | |
|---|---|---|
| M0001 | NUMBER OF TIMES OF AUTHENTICATION | 200 |
| | AMOUNT OF COMMUNICATION DATA | 500MB |
| | CONTINUOUS COMMUNICATION PERIOD | 30 DAYS |
| | ... | ... |
| ... | ... | ... |

FIG. 6

| COMMUNICATION RISK | PASS-THROUGH PERMISSION PERIOD |
|---|---|
| HIGH | 0 MINUTES |
| MIDDLE | 20 MINUTES |
| LOW | 60 MINUTES |

FIG. 7

| | | INSTRUMENT A | |
|---|---|---|---|
| | | PARAMETER VALUE | COMMUNICATION RISK |
| COMMUNICATION RESULT | NUMBER OF TIMES OF AUTHENTICATION | 200 | MIDDLE |
| | AMOUNT OF COMMUNICATION DATA | 5000MB | MIDDLE |
| | CONTINUOUS COMMUNICATION PERIOD | 30 DAYS | MIDDLE |
| ENVIRONMENTAL PARAMETER | ESTIMATED RESTORATION TIME | 20 MINUTES | MIDDLE |
| | NETWORK ENVIRONMENT | IN-HOUSE LAN | MIDDLE |
| | TOTAL RISK | MIDDLE | |
| | PASS-THROUGH PERMISSION PERIOD | 20 MINUTES | |

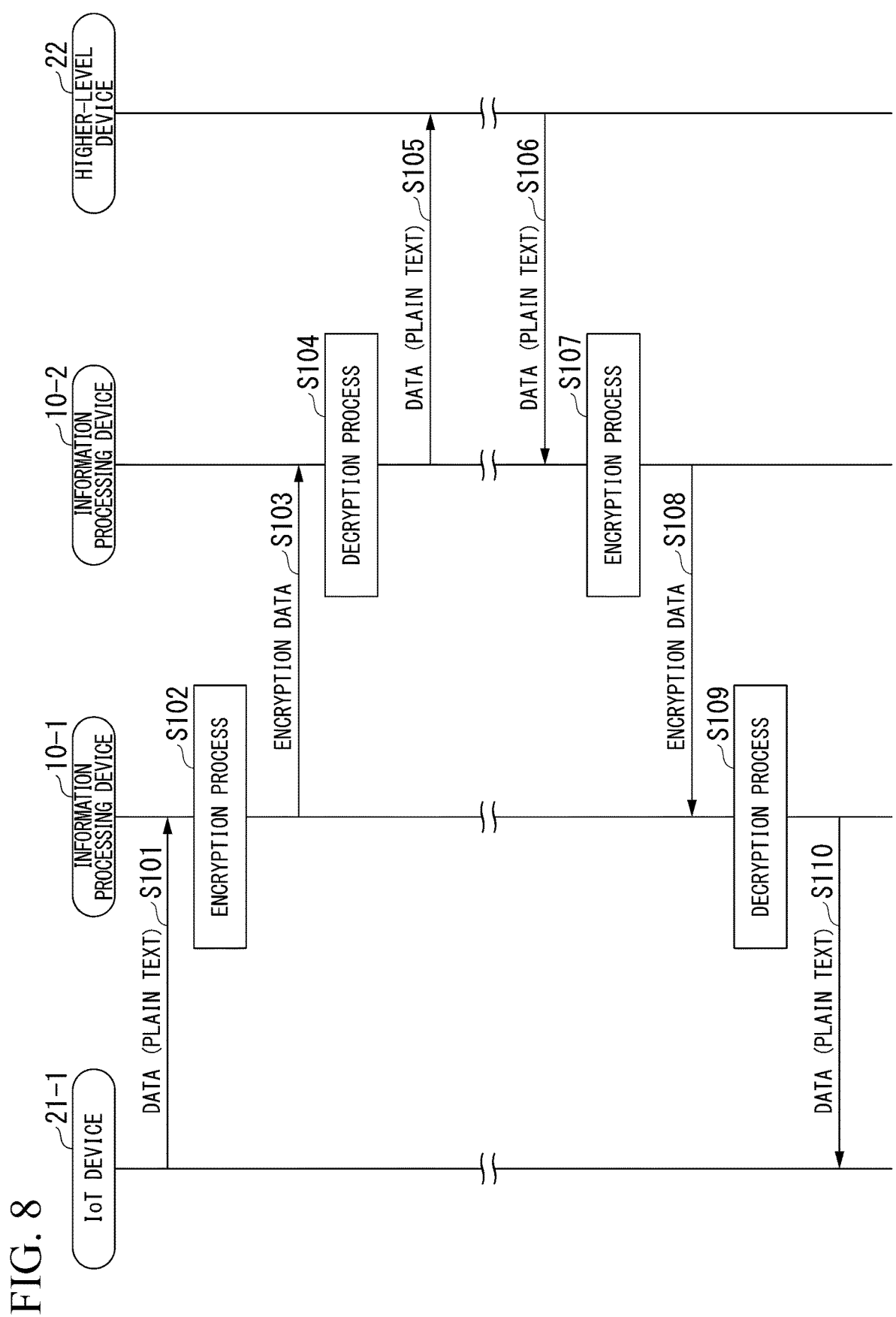

FIG. 13

| DEVICE ID | TERMINAL ID | PARAMETER NAME | | PARAMETER VALUE | COMMUNICATION RISK |
|---|---|---|---|---|---|
| M0001 | EP0001 | COMMUNICATION RESULT | NUMBER OF TIMES OF AUTHENTICATION | LESS THAN 100 | HIGH |
| | | | | EQUAL TO OR GREATER THAN 100 AND LESS THAN 5000 | MIDDLE |
| | | | | EQUAL TO OR GREATER THAN 5000 | LOW |
| | | | AMOUNT OF COMMUNICATION DATA | EQUAL TO OR GREATER THAN 1 GB | HIGH |
| | | | | EQUAL TO OR GREATER THAN 100 MB AND LESS THAN 1 GB | MIDDLE |
| | | | | LESS THAN 100 MB | LOW |
| | | | CONTINUOUS COMMUNICATION PERIOD | LESS THAN 10 DAYS | HIGH |
| | | | | EQUAL TO OR GREATER THAN 10 DAYS AND LESS THAN 100 DAYS | MIDDLE |
| | | | | EQUAL TO OR GREATER THAN 100 DAYS | LOW |
| | | | ... | ... | ... |
| | | ENVIRONMENTAL PARAMETER | ESTIMATED RESTORATION TIME | EQUAL TO OR GREATER THAN 60 MINUTES | HIGH |
| | | | | EQUAL TO OR GREATER THAN 10 MINUTES AND LESS THAN 60 MINUTES | MIDDLE |
| | | | | LESS THAN 10 MINUTES | LOW |
| | | | NETWORK ENVIRONMENT | PUBLIC COMMUNICATION NETWORK | HIGH |
| | | | | IN-HOUSE LAN | MIDDLE |
| | | | | LAN IN SPECIFIC AREA | LOW |
| | | | ... | ... | ... |
| | | ... | ... | ... | ... |
| ... | ... | ... | ... | ... | ... |

FIG. 14

| DEVICE ID | COMMUNICATION RISK | PASS-THROUGH PERMISSION PERIOD |
|---|---|---|
| M0001 | HIGH | 0 MINUTES |
| | MIDDLE | 20 MINUTES |
| | LOW | 60 MINUTES |
| ... | ... | ... |

INFORMATION PROCESSING DEVICE AND INFORMATION PROCESSING SYSTEM

[TECHNICAL FIELD]

Embodiments of the present invention relate to an information processing device and an information processing system.

[BACKGROUND ART]

In recent years, with the spread of the Internet of things (IoT), various devices (for example, IoT devices) have come to be connected to the Internet and it is becoming important to secure the security thereof. In an information processing system according to the related art, a technique of adding security to various devices by interposing an information processing device between an IoT device and a network and allowing the information processing device to secure the security of a communication path over the network is known. However, in such an information processing system according to the related art, for example, when an information processing device is out of order, the system may not continue to operate and the availability thereof may deteriorate.

[Citation List]
[Patent Literature]
[Patent Literature 1]
Japanese Unexamined Patent Application, First Publication No. 2009-117887
[Summary of Invention]
[Technical Issue]

An issue to be solved by the present invention is to provide an information processing device and an information processing system that can secure the security and improve the availability.

[Solution to Solve the Issue]

An information processing device according to some embodiments includes a first communication unit, a second communication unit, an information processing unit, and a switching unit. The first communication unit is connectable to a terminal device connectable to a network and is configured to communicate with the terminal device. The second communication unit is connectable to the network and is configured to communicate via the network with a device connected to the network. The information processing unit is configured to encrypt information, when at least the first communication unit receives information from the terminal device, and to transmit the encrypted information to the network via the second communication unit. The information processing unit is also configured to decrypt the encrypted information, when at least the second communication unit receives the encrypted information from the network, and to transmit the decrypted information to the terminal device via the first communication unit. The switching unit is configured to directly connect a communication line between the first communication unit and the terminal device to another communication line between the second communication unit and the network, when the information processing unit comes into an inoperable state including at least electric power supply stop state, and to switch into a pass-through mode in which the terminal device and the network communicate directly with each other without through the information processing unit.

[BRIEF DESCRIPTION OF DRAWINGS]

FIG. 3 is a diagram illustrating an example of data in a communication risk storage unit according to the first embodiment.

FIG. 4 is a diagram illustrating an example of data in a communication information storage unit according to the first embodiment.

FIG. 5 is a diagram illustrating an example of data in a communication result storage unit according to the first embodiment.

FIG. 6 is a diagram illustrating an example of data in a permission period storage unit according to the first embodiment.

FIG. 7 is a diagram illustrating an example in which a pass-through permission period is determined according to the first embodiment.

FIG. 8 is a diagram illustrating an example of a secret communication operation of the information processing system according to the first embodiment.

FIG. 13 is a diagram illustrating an example of data in a communication risk storage unit according to the second embodiment.

FIG. 14 is a diagram illustrating an example of data in a permission period storage unit according to the second embodiment.

[DESCRIPTION OF EMBODIMENTS]

Hereinafter, an information processing device and an information processing system according to embodiments will be described with reference to the accompanying drawings.

(First embodiment)

Figure 1:
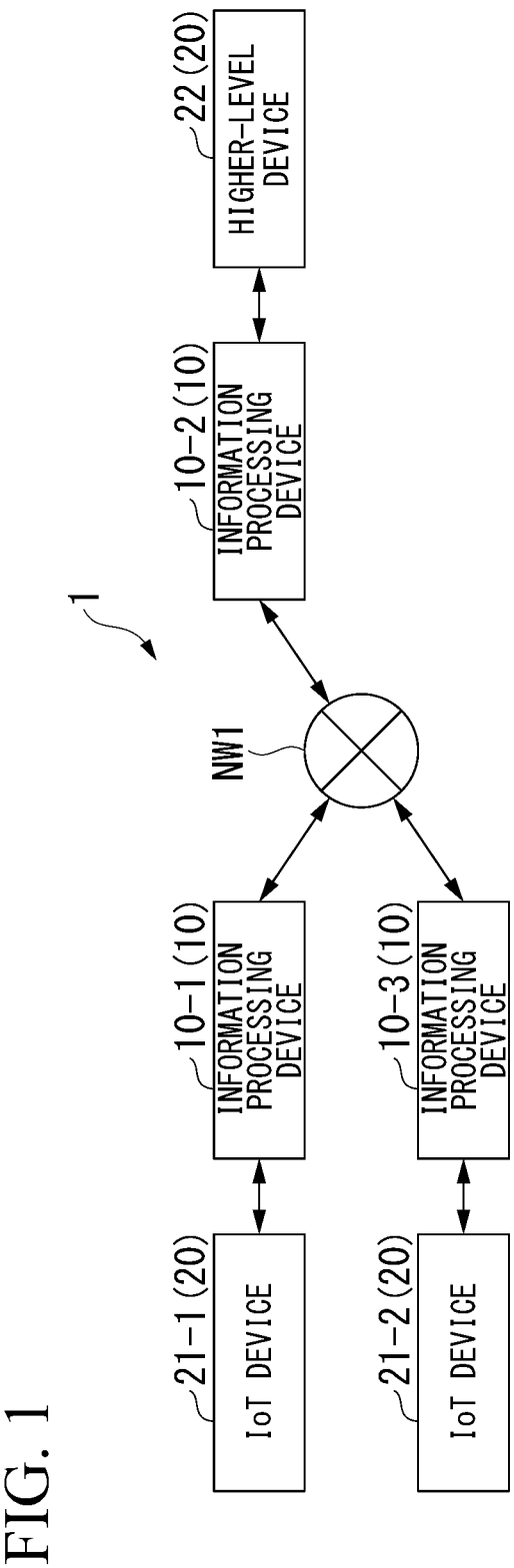
FIG. 1 is a block diagram illustrating an example of an information processing system according to a first embodiment.

FIG. 1 is a block diagram illustrating an example of an information processing system 1 according to a first embodiment.

As illustrated in FIG. 1, the information processing system 1 includes information processing devices (10-1, 10-2, 10-3, ...), IoT devices (21-1, 21-2, ...), and a higher-level device 22.

In this embodiment, the information processing device 10-1, the information processing device 10-2, and the information processing device 10-3 have the same configuration and are referred to as information processing devices 10 when any information processing device provided in the information processing system 1 is simply indicated or when they are not distinguished from each other.

Each of the IoT device 21-1, the IoT device 21-2, and the higher-level device 22 is an end point which is a device of an end connected to a network NW1 and is an example of a terminal device 20.

The network NW1 is, for example, an information communication network such as an Internet communication network or a local area network (LAN). The information processing devices (10-1, 10-2, 10-3, ...) are connected to the network NW1 and can communicate with each other via the network NW1.

The IoT devices 21-1, 21-2, . . . are, for example, computer devices such as personal computers (PC) or various types of devices that can be connected to the network NW1 such as electronic products, monitoring cameras, automobiles, machine tools, and medical devices. The IoT device 21-1 is connected to the network NW1 via the information processing device 10-1, and the IoT device 21-2 is connected to the network NW1 via the information processing device 10-2.

The higher-level device 22 is, for example, a computer device such as a server device or a PC and is connected to the network NW1 via the information processing device 10-2.

The information processing device 10 is a communication control device that is connected between a terminal device 20 and the network NW1. The information processing device 10 relays data communication by adding security to communication between the terminal device 20 and the network NW1. For example, the information processing device 10 encrypts data received from the terminal device 20 and transmits the encrypted data to the network NW1. For example, the information processing device 10 decrypts data received from the network NW1 and transmits the decrypted data to the terminal device 20.

As illustrated in FIG. 1, the information processing device 10-1 is connected between the IoT device 21-1 and the network NW1, and the information processing device 10-3 is connected between the IoT device 21-2 and the network NW1. The information processing device 10-2 is connected between the higher-level device 22 and the network NW1.

The configuration of the information processing device 10 according to this embodiment will be described below with reference to FIG. 2.

Figure 2:
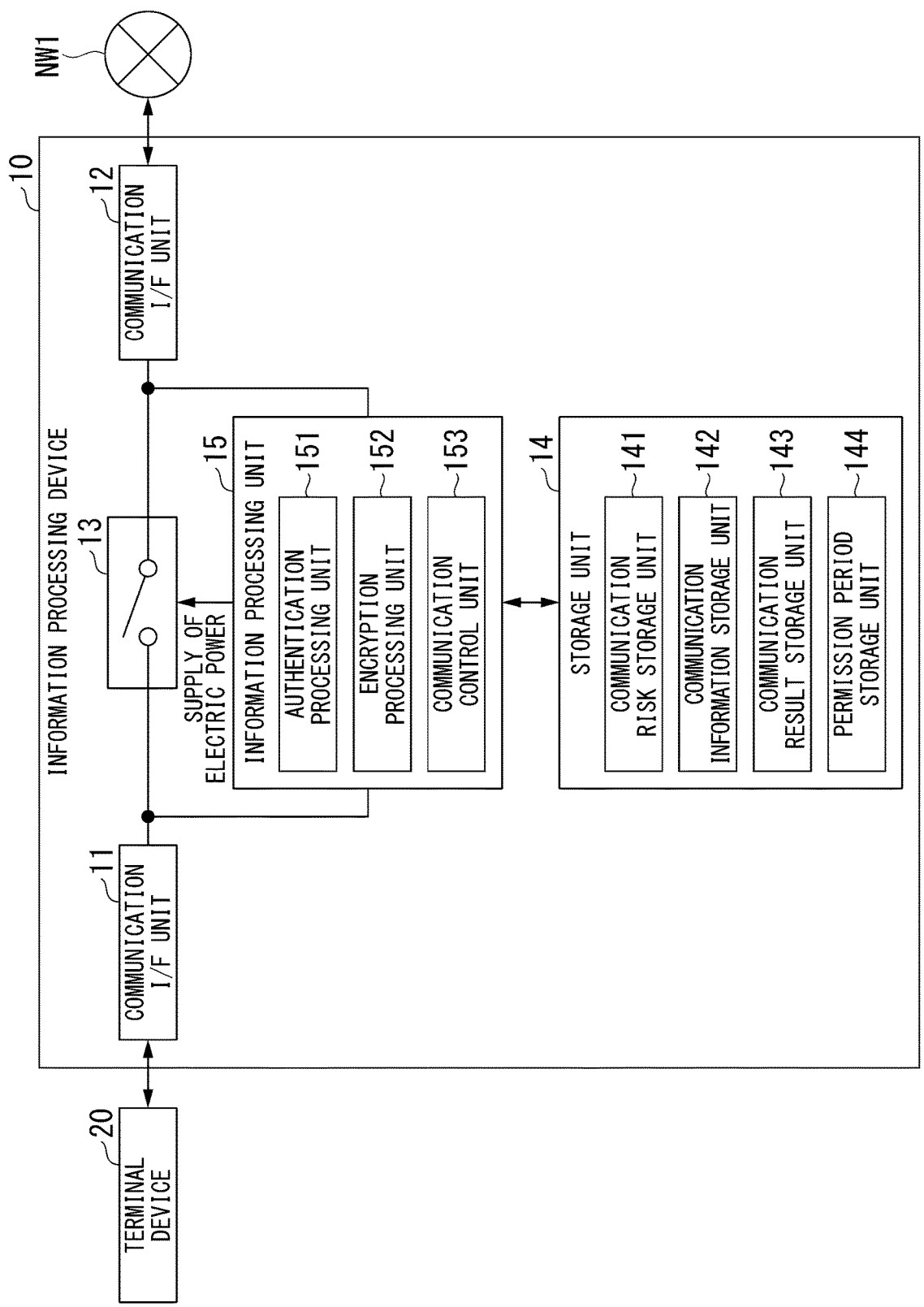
FIG. 2 is a block diagram illustrating an example of an information processing device according to the first embodiment.

FIG. 2 is a block diagram illustrating an example of the information processing device 10 according to this embodiment.

As illustrated in FIG. 2, the information processing device 10 includes a communication interface (I/F) unit 11, a communication I/F unit 12, a photo relay switch 13, a storage unit 14, and an information processing unit 15.

The communication I/F unit 11 (an example of a first communication unit) is an interface that is connected to a terminal device 20 and be able to communicate with the terminal device 20. The communication I/F unit 12 (an example of a second communication unit) is an interface that is able to communicate with a server or another device connected to the network NW1 via the network NW1.

The photo relay switch 13 (an example of a switching unit) is, for example, a normally closed switch and is connected between a communication line of the communication I/F unit 11 with the terminal device 20 and a communication line of the communication I/F unit 12 with the network NW1. The photo relay switch 13 includes a photo diode (a light emitting diode) therein and connects the communication line of the communication I/F unit 11 with the terminal device 20 and the communication line of the communication I/F unit 12 with the network NW1 by causing the photo diode to emit light.

The photo relay switch 13 switches to an on state (a connected state) by causing the photo diode to emit light when a power source (electric power) is supplied thereto and switches to an off state (a disconnected state) when a power source (electric power) is not supplied thereto. When the information processing unit 15 which will be described later comes to a disabled state including at least supply of electric power thereto being stopped, the photo relay switch 13 connects the communication line of the communication I/F unit 11 with the terminal device 20 and the communication line of the communication I/F unit 12 with the network NW1 and switches to a pass-through mode. Here, the pass-through mode is, for example, a mode in which the terminal device 20 communicates directly with the network NW1 without using the information processing unit 15. In this embodiment, the pass-through mode may also be referred to as a degeneracy mode, and a function of switching to the degeneracy mode (the pass-through mode) may be referred to as a degeneracy function.

The storage unit 14 stores various types of information which are used for various processes of the information processing device 10. The storage unit 14 includes a communication risk storage unit 141, a communication information storage unit 142, a communication result storage unit 143, and a permission period storage unit 144.

The communication risk storage unit 141 stores a list of communication risks of parameters associated with a communication state of a counterpart information processing device 10. The communication risk storage unit 141 stores, for example, values of the parameters and the communication risks in correlation with each other. An example of data stored in the communication risk storage unit 141 will be described below with reference to FIG. 3.

FIG. 3 is a diagram illustrating an example of data stored in the communication risk storage unit 141 according to this embodiment.

As illustrated in FIG. 3, the communication risk storage unit 141 stores a "parameter name," a "parameter value," and a "communication risk" in correlation with each other. Here, the "parameter name" indicates an item of the parameter associated with the communication state of the counterpart information processing device 10. The parameter includes, for example, a "communication result," and the "communication result" includes, for example, the "number of times of authentication," an "amount of communication data," and a "continuous communication period."

The "number of times of authentication" indicates the number of times an authentication process such as cross authentication has been performed between the host device (the information processing device 10) and the counterpart information processing device 10, and the "amount of communication data" indicates an amount of communication data between the host device and the counterpart information processing device 10. The "continuous communication period" indicates a period (for example, days) in which the host device and the counterpart information processing device 10 continuously communicated with each other.

The parameter includes, for example, an "environmental parameter," and the "environmental parameter" includes, for example, an "estimated restoration period" and a "network environment."

The "estimated restoration period" indicates a period which is estimated until restoration to a normal mode in which normal communication using the information processing unit 15 is performed when the counterpart information processing device 10 has been out of order and comes tino the pass-through mode. The "network environment" indicates, for example, an installation environment of the network NW1 and indicates, for example, a network environment such as a public communication network such as the Internet or a local network such as an in-house LAN. Here, the installation environment of the network NW1 is an example of exploitability score indicating easiness of an attack in the network NW1.

The "communication risk" indicates a risk when communication is performed in a state in which security is not secured when the counterpart information processing device 10 is in the pass-through mode. In this embodiment, the "communication risk" is expressed by "high" (a high risk), a "middle" (a middle risk), and a "low" (a low risk).

In the example illustrated in FIG. 3, the "communication risk" is "high" when the "parameter value" of the "number of times of authentication" is "less than 100," and the "communication risk" is "middle" when the "parameter value" of the "number of times of authentication" is "equal to or greater than 100 and less than 5000." When the "parameter value" of the "number of times of authentication" is "equal to or greater than 5000," the "communication risk" is "low."

In the example illustrated in FIG. 3, for example, the "communication risk" is set to be lower as the "number of times of authentication" becomes greater, and the "communication risk" is set to be higher as the "number of times of authentication" becomes less. The "communication risk" is set to be higher as the "amount of communication data" becomes greater, and the "communication risk" is set to be lower as the "amount of communication data" becomes less. The "communication risk" is set to be lower as the "continuous communication period" becomes longer, and the "communication risk" is set to be higher as the "continuous communication period" becomes shorter. The "communication risk" is set to be higher as the "estimated restoration period" becomes longer, and the "communication risk" is set to be lower as the "estimated restoration period" becomes shorter. The "communication risk" is set to be lower as the range of the "network environment" becomes narrower, and the "communication risk" is set to be higher as the range of the "network environment" becomes wider.

Referring back to FIG. 2, the communication information storage unit 142 stores communication information for each counterpart information processing device 10. An example of data stored in the communication information storage unit 142 will be described below with reference to FIG. 4.

FIG. 4 is a diagram illustrating an example of data stored in the communication information storage unit 142 according to this embodiment.

As illustrated in FIG. 4, the communication information storage unit 142 stores a "device ID" and "communication information" in correlation with each other. Here, the "device ID" is identification information for identifying a counterpart information processing device 10. The "communication information" includes a "communication mode," an "authentication mode," "device information," an "estimated restoration time," and a "network environment." The "device information" is, for example, a MAC address value or an IP address and is an example of identification information of a counterpart.

In the example illustrated in FIG. 4, the "communication information" in communication between an information processing device 10 with a "device ID" of "M0001" and the host device indicates that the "communication mode" is "SSL" (Secure Sockets Layer) and the "authentication mode" is "HTTP/FTP." The "device information" of the counterpart information processing device 10 is "XX:XX:XX:XX:XX:XX." The "estimated restoration time" of the counterpart information processing device 10 is "20 minutes" and the "network environment" is an "in-house LAN."

As described above, the communication information storage unit 142 stores the "communication information" for each counterpart information processing device 10.

Referring back to FIG. 2, the communication result storage unit 143 stores communication result information of a counterpart information processing device 10. An example of data stored in the communication result storage unit 143 will be described below with reference to FIG. 5.

FIG. 5 is a diagram illustrating an example of data stored in the communication result storage unit 143 according to this embodiment.

As illustrated in FIG. 5, the communication result storage unit 143 stores a "device ID" and "communication result information" in correlation with each other. Here, the "communication result information" is information indicating a communication result between the host device and the counterpart information processing device 10 and includes, for example, the "number of times of authentication," the "amount of communication data," and the "continuous communication period."

In the example illustrated in FIG. 5, the "communication result information" between the host device and a counterpart information processing device 10 with a "device ID" of "M0001" indicates that the "number of times of authentication" is "200," the "amount of communication data" is "500 MB" (where MB is megabyte), and the "continuous communication period" is "30 days."

In this way, the communication result storage unit 143 stores the communication result information for each counterpart information processing device 10.

Referring back to FIG. 2, the permission period storage unit 144 stores a communication risk and a pass-through permission period (an example of a predetermined period) in correlation with each other. An example of data stored in the permission period storage unit 144 will be described below with reference to FIG. 6.

FIG. 6 is a diagram illustrating an example of data stored in the permission period storage unit 144 according to this embodiment.

As illustrated in FIG. 6, the permission period storage unit 144 stores a "communication risk" and a "pass-through permission period" in correlation with each other. Here, the "pass-through permission period" indicates a period in which communication in the pass-through mode is permitted in communication between the host device and a counterpart information processing device 10.

In the example illustrated in FIG. 6, the "pass-through permission period" is "0 minutes" when the "communication risk" is "high" (the high risk). The "pass-through permission period" is "20 minutes" when the "communication risk" is "middle" (the middle risk). The "pass-through permission period" is "60 minutes" when the "communication risk" is "low" (the low risk).

In this way, in this embodiment, the "pass-through permission period" is set to be shorter as the "communication risk" becomes higher.

Referring back to FIG. 2, the information processing unit 15 is, for example, a processor including a central processing unit (CPU) and comprehensively controls the information processing device 10. The information processing unit 15 performs, for example, a process of controlling communication between the terminal device 20 and a counterpart information processing device 10 via the network NW1. For example, when the communication I/F unit 11 receives information (data) from the terminal device the information processing unit 15 encrypts the received information (data) and transmits the encrypted information to the network NW1 via the communication OF unit 12. For example, when the communication I/F unit 12 receives information (data) from the network NW1, the information processing unit 15 decrypts the received information (data) and transmits the decrypted information to the terminal device 20 via the communication I/F unit 11.

The information processing unit 15 includes an authentication processing unit 151, an encryption processing unit 152, and a communication control unit 153.

The authentication processing unit 151 performs an authentication process such as cross authentication for ascertaining validity between the host device and the counterpart information processing device 10.

The encryption processing unit 152 performs an encryption process and a decryption process using a public key cryptosystem such as an RAS cryptosystem or a common key cryptosystem. The encryption processing unit 152 performs an encryption process and a decryption process in the authentication process or secret communication of encrypted data.

The communication control unit 153 controls communication between the terminal device 20 (for example, the IoT device 21-1 or the higher-level device 22) and the counterpart information processing device 10 and the host device. The communication control unit 153 generates, for example, a session key between the host device and the counterpart information processing device 10. For example, when the communication I/F unit 11 receives data (plain text data) from the terminal device 20, the communication control unit 153 causes the encryption processing unit 152 to encrypt the received data using the session key. The communication control unit 153 transmits the encrypted data (encryption data) to the counterpart information processing device 10 via the communication I/F unit 12 and the network NW1.

For example, when data (encryption data) is received from the counterpart information processing device 10 via the network NW1 and the communication I/F unit 12, the communication control unit 153 causes the encryption processing unit 152 to decrypt the received data using the session key. The communication control unit 153 transmits the decrypted data (plain text data) to the terminal device 20 via the communication I/F unit 11.

The communication control unit 153 stores the communication information in communication with the counterpart information processing device 10 in the communication information storage unit 142, for example, as illustrated in FIG. 4. The communication control unit 153 stores the communication result in communication with the counterpart information processing device 10 in the communication result storage unit 143 as illustrated in FIG. 5.

When the counterpart information processing device 10 is in the pass-through mode, the communication control unit 153 permits (allows) communication with a counterpart terminal device 20 (for example, the higher-level device 22) during a predetermined period (for example, the pass-through permission period) on the basis of the parameters associated with the communication state with the counterpart information processing device 10. The communication control unit 153 limits (prohibits) communication with the counterpart terminal device 20 after the predetermined period has elapsed.

The counterpart terminal device 20 is a counterpart terminal device with which the terminal device 20 communicates via the network NW1 and is, for example, the higher-level device 22. The counterpart information processing device 10 is an information processing device 10-2 that is connected between the counterpart terminal device (the higher-level device 22) and the network NW1 and has the same configuration as the host device (the information processing device 10-1). That is, similarly to the information processing device 10-1, the information processing device 10-2 also includes a communication I/F unit 11, a communication I/F unit 12, an information processing unit 15, and a photo relay switch 13.

The aforementioned parameters include a communication result with the counterpart information processing device 10 (for example, the number of times of authentication, an amount of communication data, and a continuous communication period), and the communication control unit 153 determines the pass-through permission period on the basis of the communication result. The parameters include an estimated restoration time until the pass-through mode of the counterpart information processing device 10 is released, and the communication control unit 153 determines the pass-through permission period on the basis of the estimated restoration time. The parameters include exploitability score indicating easiness of an attack in the network NW1, and the communication control unit 153 determines the pass-through permission period on the basis of the exploitability score (for example, the network environment).

The communication control unit 153 determines the pass-through permission period, for example, on the basis of the communication risk for the counterpart terminal device (the higher-level device 22) acquired on the basis of the values of the parameters corresponding to the counterpart information processing device 10 from the communication risk storage unit 141. Specifically, the communication control unit 153 acquires the environmental parameters (for example, the estimated restoration time and the network environment) corresponding to the counterpart information processing device 10 from the communication information storage unit 142 and acquires the communication risk corresponding to the environmental parameters from the communication risk storage unit 141. The communication control unit 153 acquires the communication result (for example, the number of times of authentication, the amount of communication data, and the continuous communication period) corresponding to the counterpart information processing device 10 from the communication result storage unit 143 and acquires the communication risk corresponding to the communication result from the communication risk storage unit 141.

FIG. 7 is a diagram illustrating an example in which the pass-through permission period is determined according to this embodiment.

The example illustrated in FIG. 7 is an example in which a counterpart terminal device is an "instrument A." The communication control unit 153 acquires the communication risk from the communication risk storage unit 141 on the basis of the communication result and the environmental parameters corresponding to a counterpart information processing device 10 to which the "instrument A" is connected as illustrated in FIG. 7. In the example illustrated in FIG. 7, since the communication risks are "middle" in all items, the communication control unit 153 determines that a total risk (the total communication risk) is "middle," acquires the pass-through permission period ("20 minutes") corresponding to the communication risk of "middle" from the permission period storage unit 144, and determines the pass-through permission period.

As illustrated in FIG. 7, when the pass-through permission period is determined using the communication risks corresponding to the items of a plurality of parameters, the communication control unit 153 may determine the total communication risk, for example, on the basis of the majority of the plurality of communication risks or on the basis of the highest communication risk.

The communication control unit 153 detects whether the counterpart information processing device 10 is in the pass-through mode on the basis of at least one of a communication method in communication with the counterpart information processing device 10, an authentication mode, and identification information of the counterpart. The communication control unit 153 detects whether the counterpart information processing device 10 is in the pass-through mode, for example, on the basis of the communication information stored in the communication information storage unit 142. That is, the communication control unit 153 compares communication information in current communication with the communication information stored in the communication information storage unit 142 and determines that the counterpart information processing device 10 is in the pass-through mode when there is a difference therebetween.

Operations of the information processing system 1 according to this embodiment will be described below with reference to the drawings.

FIG. 8 is a diagram illustrating an example of a secret communication operation of the information processing system 1 according to this embodiment. In the drawing, an example in which communication between the IoT device 21-1 and the higher-level device 22 is secret communication using the information processing device 10-1 and the information processing device 10-2 is illustrated. It is assumed that the authentication process and the session key creating process between the information processing device and the information processing device 10-2 have been completed.

In FIG. 8, first, the IoT device 21-1 transmits data (plain text) to the information processing device 10-1 (Step S101). The communication control unit 153 of the information processing device 10-1 receives the data from the IoT device 21-1 via the communication I/F unit 11.

Then, the information processing device 10-1 performs an encryption process (Step S102). The communication control unit 153 of the information processing device 10-1 causes the encryption processing unit 152 to encrypt the data received from the IoT device 21-1 using a session key.

Then, the information processing device 10-1 transmits encryption data to the information processing device 10-2 via the network NW1 (Step S103). The communication control unit 153 of the information processing device 10-1 transmits encryption data which is data encrypted by the encryption processing unit 152 to the information processing device 10-2 via the communication I/F unit 12 and the network NW1. The communication control unit 153 of the information processing device 10-2 receives the encryption data from the information processing device 10-1 via the communication I/F unit 12.

Then, the information processing device 10-2 performs a decryption process (Step S104). The communication control unit 153 of the information processing device 10-2 causes the encryption processing unit 152 to decrypt the received encryption data using the session key.

Then, the information processing device 10-2 transmits data (plain text) to the higher-level device 22 (Step S105). The communication control unit 153 of the information processing device 10-2 transmits the data (plain text) decrypted by the encryption processing unit 152 to the higher-level device 22 via the communication OF unit 11.

The higher-level device 22 transmits data (plain text) to the information processing device 10-2 (Step S106). The communication control unit 153 of the information processing device 10-2 receives the data from the higher-level device 22 via the communication I/F unit 11.

Then, the information processing device 10-2 performs an encryption process (Step S107). The communication control unit 153 of the information processing device 10-2 causes the encryption processing unit 152 to encrypt the data received from the higher-level device 22 using the session key.

Then, the information processing device 10-2 transmits encryption data to the information processing device 10-1 via the network NW1 (Step S108). The communication control unit 153 of the information processing device 10-2 transmits encryption data which is data encrypted by the encryption processing unit 152 to the information processing device 10-1 via the communication I/F unit 12 and the network NW1. The communication control unit 153 of the information processing device 10-1 receives the encryption data from the information processing device 10-2 via the communication I/F unit 11.

Then, the information processing device 10-1 performs a decryption process (Step S109). The communication control unit 153 of the information processing device causes the encryption processing unit 152 to decrypt the received encryption data using the session key.

Then, the information processing device 10-1 transmits data (plain text) to the IoT device 21-1 (Step S110) The communication control unit 153 of the information processing device 10-1 transmits data (plain text) decrypted by the encryption processing unit 152 to the IoT device 21-1 via the communication I/F unit 11.

In this way, the information processing system 1 according to this embodiment enables secret communication by connecting the information processing device 10-1 and information processing device 10-2 between the IoT device 21-1 and the higher-level device 22.

Operations of a degeneracy function of an information processing device 10 according to this embodiment will be described below with reference to FIG. 9.

Figure 9:
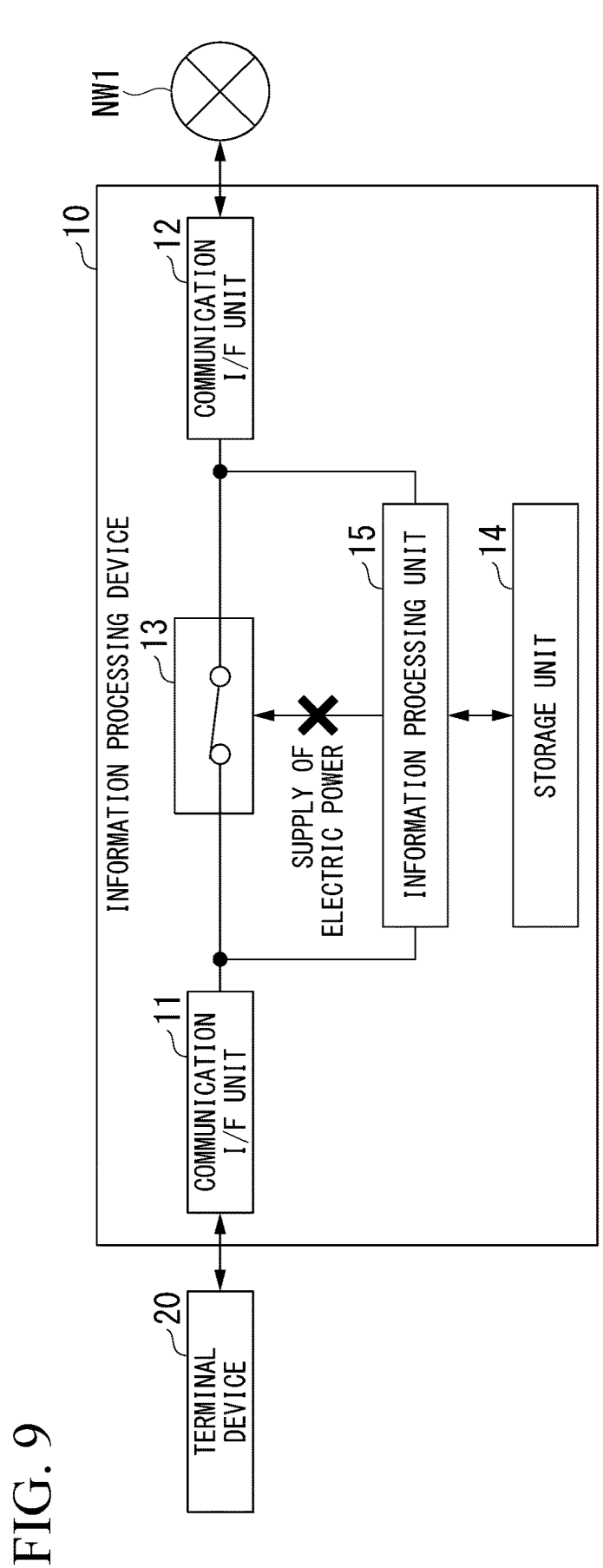
FIG. 9 is a diagram illustrating an example of an operation of a degeneracy function of the information processing device according to the first embodiment.

FIG. 9 is a diagram illustrating an example of the operations of the degeneracy function of the information processing device 10 according to this embodiment.

The photo relay switch 13 is supplied with a power source (electric power) from the information processing unit 15 and is turned off in a state (a normal mode) in which the information processing unit 15 operates normally.

In the normal mode, for example, when supply of a power source (electric power) to the photo relay switch 13 from the information processing unit 15 is stopped due to supply of electric power thereto being stopped, the photo relay switch 13 is turned on and connects a communication line of the communication I/F unit 11 with the terminal device 20 and a communication line of the communication I/F unit 12 with the network NW1. Accordingly, the information processing device 10 operates in a pass-through mode.

In this way, the information processing device 10 according to this embodiment has a degeneracy function of switching to the pass-through mode when the information processing unit 15 is disabled due to supply of electric power thereto being stopped or the like.

An operation of detecting the pass-through mode and an operation of determining the pass-through permission period which are performed by the information processing device 10 according to this embodiment will be described below with reference to FIG. 10.

Figure 10:
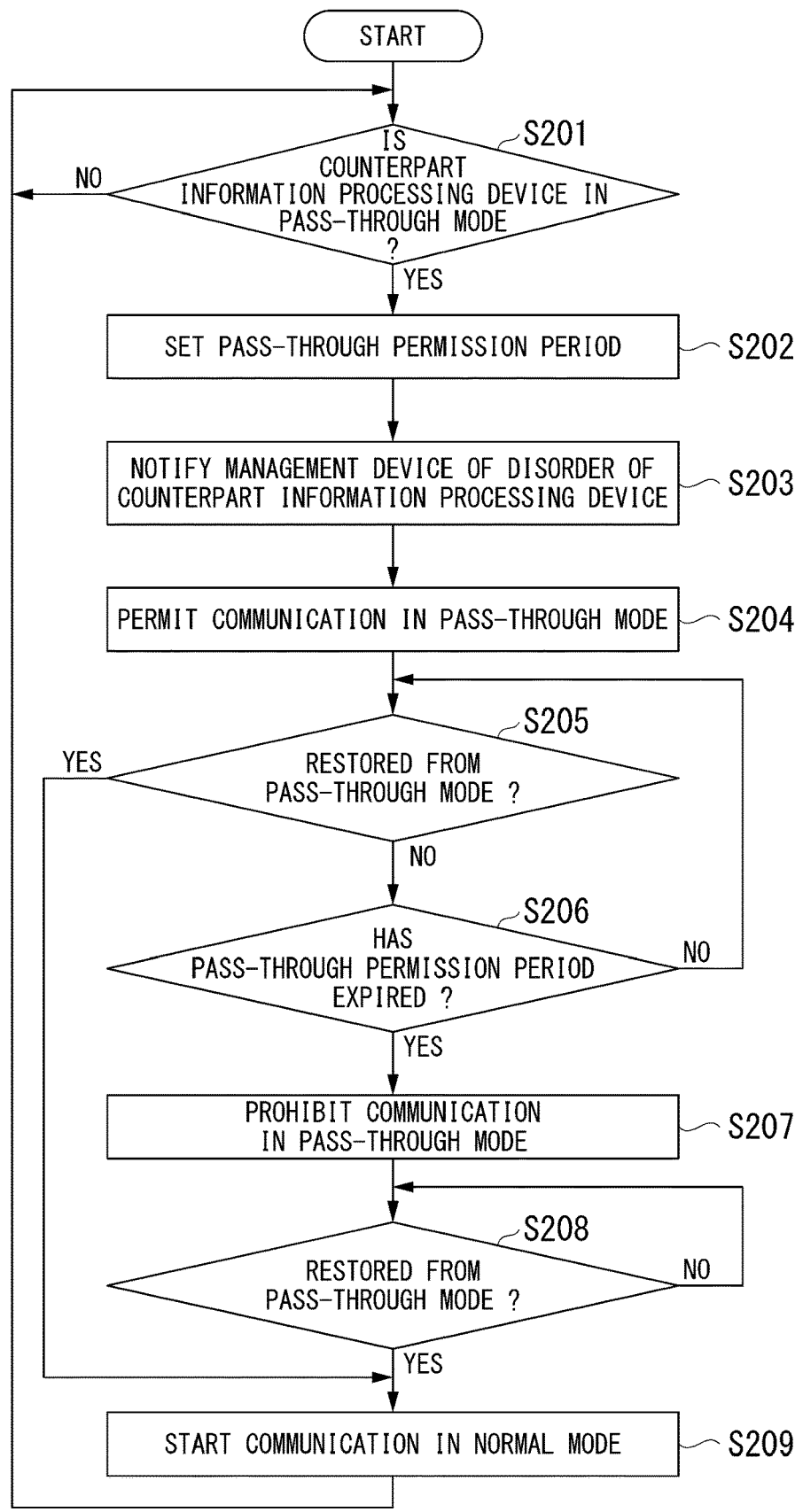
FIG. 10 is a flowchart illustrating an example of an operation of the information processing device according to the first embodiment.

FIG. 10 is a flowchart illustrating an example of the operations of the information processing device 10 according to this embodiment.

In FIG. 10, the information processing unit 15 of the information processing device 10 first determines whether a counterpart information processing device 10 is in the pass-through mode (Step S201). For example, the communication control unit 153 of the information processing unit 15 compares communication information in current communication with the communication information stored in the communication information storage unit 142 with reference to the communication information stored in the communication information storage unit 142, and determines whether the counterpart information processing device 10 is in the pass-through mode depending on whether two pieces of communication information match each other. For example, when the counterpart information processing device 10 is in the pass-through mode (Step S201: YES), the communication control unit 153 causes the routine to proceed to Step S202. For example, when the counterpart information processing device 10 is not in the pass-through mode (Step S201: NO), the communication control unit 153 returns the routine to Step S201.

In Step S202, the communication control unit 153 sets a pass-through permission period. That is, the communication control unit 153 acquires the communication result corresponding to the counterpart information processing device 10 stored in the communication information storage unit 142 and the environmental parameters from the communication result storage unit 143 and the communication information storage unit 142 and acquires the communication risks corresponding to the communication result and the environmental parameters from the communication risk storage unit 141. The communication control unit 153 determines the total communication risk from the plurality of communication risks, for example, as illustrated in FIG. 7 and acquires the pass-through permission period corresponding to the total communication risk from the permission period storage unit 144.

Then, the communication control unit 153 notifies a management device (not illustrated) of disorder of the counterpart information processing device 10 (Step S203). The management device informs a person in charge of maintenance that the counterpart information processing device 10 is out of order, for example, by electronic mail, and prepares for repair of the out-of-order information processing device 10.

Then, the communication control unit 153 permits communication in the pass-through mode (Step S204). The communication control unit 153 performs communication in the pass-through mode between the host device (the information processing device 10) and the terminal device 20 (for example, the higher-level device 22) connected to the counterpart information processing device 10.

Then, the communication control unit 153 determines whether the counterpart information processing device 10 has been restored from the pass-through mode (Step S205). Similarly to determination of the pass-through mode, the communication control unit 153 determines whether the counterpart information processing device 10 has been restored from the pass-through mode, for example, by comparing communication information in current communication with respect to the communication information stored in the communication information storage unit 142. When the counterpart information processing device 10 has been restored from the pass-through mode (Step S205: YES), the communication control unit 153 causes the routine to proceed to Step S209. When the counterpart information processing device 10 has not been restored from the pass-through mode (Step S205: NO), the communication control unit 153 causes the routine to proceed to Step S206.

In Step S206, the communication control unit 153 determines whether the pass-through permission period has expired. The communication control unit 153 determines whether the pass-through permission period has elapsed after communication in the pass-through mode has been permitted. When the pass-through permission period has expired (Step S206: YES), the communication control unit 153 causes the routine to proceed to Step S207. When the pass-through permission period has not expired (Step S206: NO), the communication control unit 153 returns the routine to Step S205.

In Step S207, the communication control unit 153 prohibits communication in the pass-through mode.

Then, the communication control unit 153 determines whether the counterpart information processing device 10 has been restored from the pass-through mode again (Step S208). When the counterpart information processing device 10 has been restored from the pass-through mode (Step S208: YES), the communication control unit 153 causes the routine to proceed to Step S209. When the counterpart information processing device 10 has not been restored from the pass-through mode (Step S208: NO), the communication control unit 153 returns the routine to Step S208.

In Step S209, the communication control unit 153 starts communication in the normal mode. The communication control unit 153 returns the routine to Step S201 after the process of Step S209 has been performed.

As described above, the information processing device 10 according to this embodiment includes the communication I/F unit 11 (a first communication unit), the communication I/F unit 12 (a second communication unit), the information processing unit 15, and the photo relay switch 13 (a switching unit). The communication I/F unit 11 is connected to a terminal device 20 that is a device of an end point connected to the network NW1 and is able to communicate with the terminal device 20. The communication I/F unit 12 is connected to the network NW1 and is able to communicate with a device connected to the network NW1 via the network NW1. When at least the communication I/F unit 11 receives information from the terminal device 20, the information processing unit 15 encrypts the received information and transmits the encrypted information to the network NW1 via the communication I/F unit 12. When at least the communication I/F unit 12 receives encrypted information from the network NW1, the information processing unit 15 decrypts the received information and transmits the decrypted information to the terminal device 20 via the communication I/F unit 11. When the information processing unit 15 comes into a disabled state including at least supply of electric power thereto being stopped, the photo relay switch 13 directly connects a communication line of the communication I/F unit 11 with the terminal device 20 and a communication line of the communication I/F unit 12 with the network NW1 and switches to the pass-through mode in which the terminal device 20 and the network NW1 communicate directly with each other without using the information processing unit 15.

Accordingly, with the information processing device 10 according to this embodiment, for example, when the information processing unit 15 comes into the disabled state including at least supply of electric power thereto being stopped, the communication mode is switched to the pass-through mode and thus communication can be maintained. With the information processing device 10 according to this embodiment, since the information processing unit 15 transmits encrypted information over the network NW1, it is possible to secure the security. Accordingly, with the information processing device 10 according to this embodiment, it is possible to secure the security and to improve availability.

Since secret communication is enabled without any change in the terminal device 20 by interposing the information processing device 10 between the terminal device 20 and the network NW1, it is possible to easily add security to an existing system and to improve the security.

In this embodiment, when the counterpart information processing device 10 comes into the pass-through mode, the information processing unit 15 allows (for example, permits) communication with a counterpart terminal device (for example, the higher-level device 22) during a predetermined period (for example, the pass-through permission period) on the basis of the parameters associated with the communication state with the counterpart information processing device 10, and limits (for example, prohibits) communication with the higher-level device 22 after the predetermined period has elapsed. Here, the counterpart information processing device 10 is connected between the counterpart terminal device (for example, the higher-level device 22) which is the terminal device 20 of the counterpart with which the terminal device 20 communicates via the network NW1 and the network NW1, and includes the communication I/F unit 11, the communication I/F unit 12, the information processing unit 15, and the photo relay switch 13.

Accordingly, with the information processing device 10 according to this embodiment, for example, since a period in which communication in the pass-through mode is permitted is limited on the basis of the parameters associated with the communication state, it is possible to further secure the security and to improve availability.

In this embodiment, the information processing unit 15 determines the pass-through permission period on the basis of the communication risk for the counterpart terminal device which has been acquired on the basis of the values of the parameters corresponding to the counterpart information processing device 10 from the communication risk storage unit 141 in which the values of the parameters associated with the communication state and the communication risks are stored in correlation with each other.

Accordingly, the information processing device 10 according to this embodiment can appropriately determine the pass-through permission period according to the communication risk.

In this embodiment, the parameters associated with the communication state include the communication results with the counterpart information processing device 10 (for example, the number of times of authentication, the amount of communication data, and the continuous communication period), and the information processing unit 15 determines the pass-through permission period on the basis of the communication results.

Accordingly, the information processing device 10 according to this embodiment can appropriately determine the pass-through permission period according to the communication results with the counterpart information processing device 10.

In this embodiment, the parameters associated with the communication state include the estimated restoration time until the pass-through mode in the counterpart information processing device 10 is released, and the information processing unit 15 determines the pass-through permission period on the basis of the estimated restoration time.

Accordingly, the information processing device 10 according to this embodiment can appropriately determine the pass-through permission period in consideration of the period until the counterpart information processing device 10 and the information processing system 1 are restored.

In this embodiment, the parameters associated with the communication state include exploitability score indicating easiness of an attack in the network NW1, and the information processing unit 15 determines the pass-through permission period on the basis of the exploitability score (for example, the network environment).

Accordingly, the information processing device 10 according to this embodiment can appropriately determine the pass-through permission period in consideration of the exploitability score for the information processing system 1.

In this embodiment, the information processing unit 15 detects whether the counterpart information processing device 10 comes into the pass-through mode on the basis of at least one of the communication mode in communication with the counterpart information processing device 10, the authentication mode, and the counterpart identification information (for example, an MAC address).

Accordingly, the information processing device 10 according to this embodiment can detect whether a counterpart information processing device 10 comes into the pass-through mode with high accuracy.

The information processing device 10 according to this embodiment includes the communication information storage unit 142 in which communication information including at least one of the communication mode in communication with the counterpart information processing device 10, the authentication mode, and the counterpart identification information is stored. The information processing unit 15 detects whether the counterpart information processing device 10 comes into the pass-through mode on the basis of the communication information stored in the communication information storage unit 142.

Accordingly, the information processing device 10 according to this embodiment can detect whether a counterpart information processing device 10 comes into the pass-through mode with high accuracy using a simple method.

The information processing system 1 according to this embodiment includes a plurality of terminal devices 20 and a plurality of information processing devices 10 that are the aforementioned information processing device 10 and that are connected between the plurality of terminal devices 20 and the network NW1.

Accordingly, the information processing system 1 according to this embodiment can achieve the same advantages as in the aforementioned information processing device 10 and it is possible to secure the security and to improve availability.

(Second embodiment)

An information processing device 10a and an information processing system 1a according to a second embodiment will be described below with reference to the drawings.

In this embodiment, an example in which the information processing system 1a includes a management device 30 and the management device 30 includes some functions of the storage unit 14 of the information processing device 10 according to the first embodiment will be described.

Figure 11:
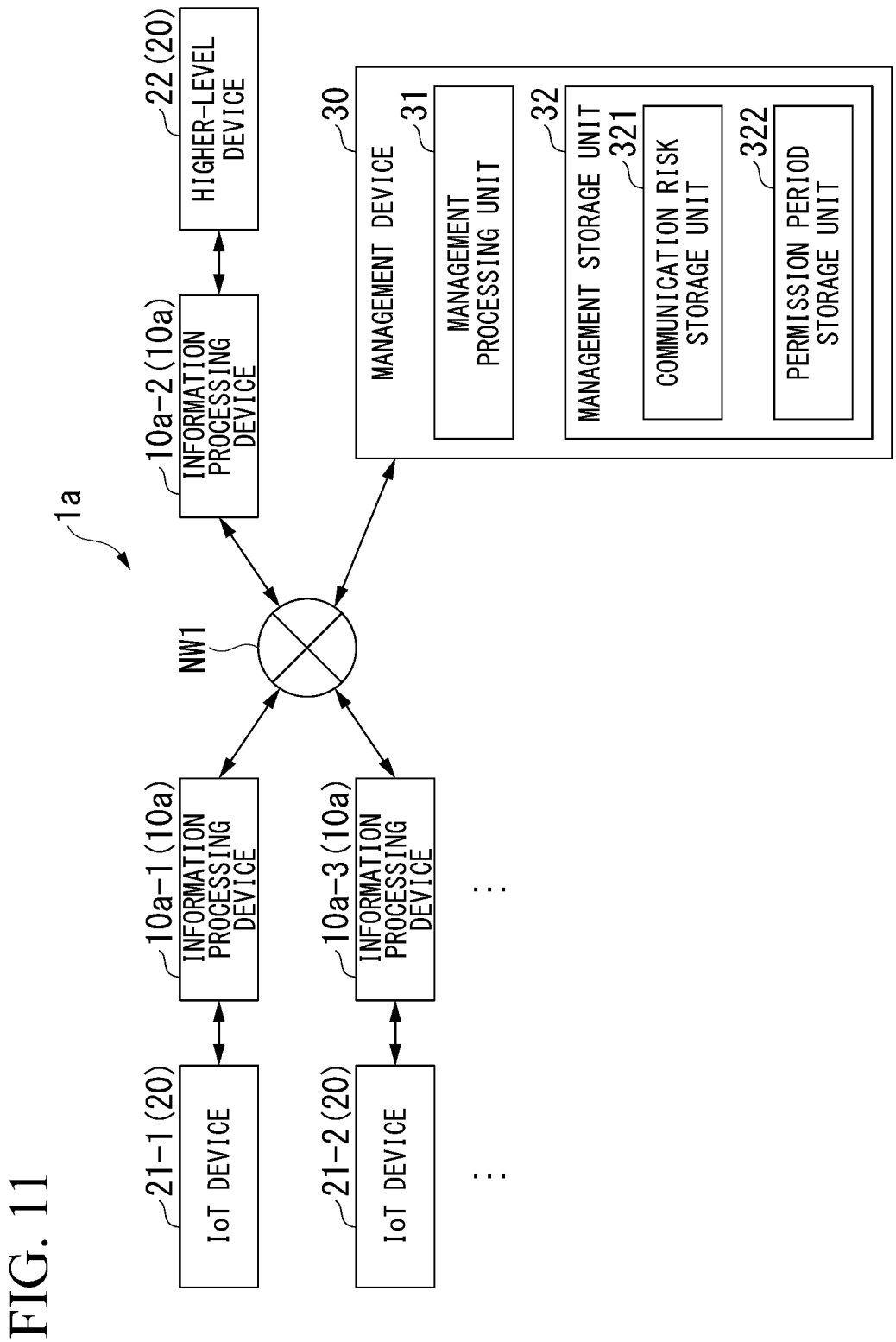
FIG. 11 is a block diagram illustrating an example of an information processing system according to a second embodiment.

FIG. 11 is a block diagram illustrating an example of the information processing system 1a according to the second embodiment.

As illustrated in FIG. 11, the information processing system 1a includes information processing devices (10a-1, 10a-2, 10a-3, . . . ), IoT devices (21-1, 21-2, . . . ), a higher-level device 22, and a management device 30.

In this drawing, the same elements as in FIG. 1 will be referred to by the same reference signs and description thereof will be omitted.

In this embodiment, the information processing device 10a-1, the information processing device 10a-2, and the information processing device 10a-3 have the same configuration, and are referred to as an information processing device 10a when an information processing device included in the information processing system 1a is simply indicated or when they are not distinguished.

The information processing device 10a is a communication control device that is connected between a terminal device 20 and a network NW1. The information processing device 10a adds security to communication between the terminal device 20 and the network NW1 and relays data communication.

As illustrated in FIG. 11, the information processing device 10a-1 is connected between the IoT device 21-1 and the network NW1, and the information processing device 10a-3 is connected between the IoT device 21-2 and the network NW1. The information processing device 10a-2 is connected between the higher-level device 22 and the network NW1.

Figure 12:
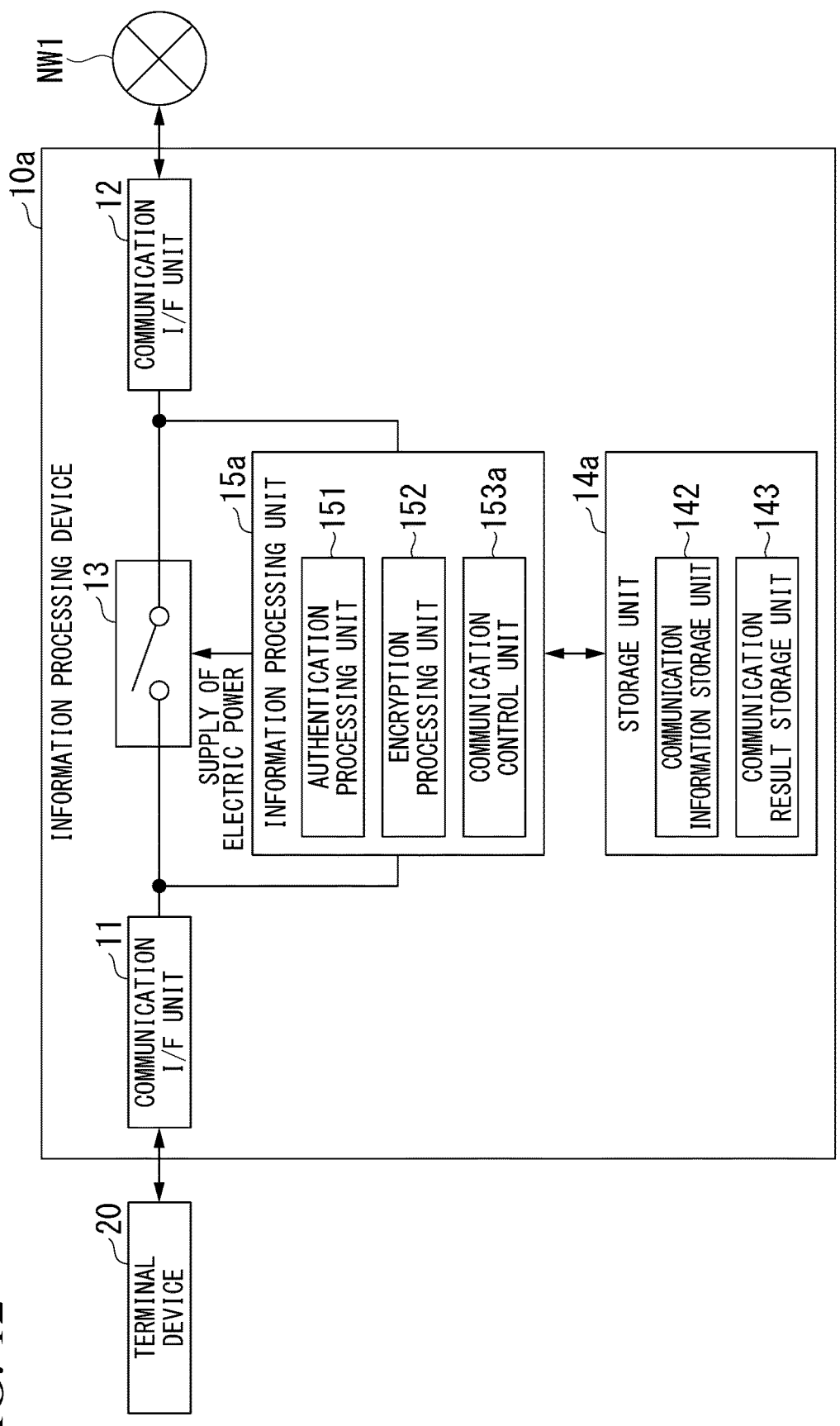
FIG. 12 is a block diagram illustrating an example of an information processing device according to the second embodiment.

FIG. 12 is a block diagram illustrating an example of the information processing device 10a according to this embodiment.

As illustrated in FIG. 12, the information processing device 10a includes a communication I/F unit 11, a communication I/F unit 12, a photo relay switch 13, a storage unit 14a, and an information processing unit 15a.

In FIG. 12, the same elements as in FIG. 2 will be referred to by the same reference signs and description thereof will be omitted.

The storage unit 14a stores various types of information which are used in various processes of the information processing device 10a. The storage unit 14a includes a communication information storage unit 142 and a communication result storage unit 143. The storage unit 14a is different from the storage unit 14 of the first embodiment, in that the storage unit 14a does not include the communication risk storage unit 141 and the permission period storage unit 144.

The information processing unit 15a is, for example, a processor including a CPU and comprehensively controls the information processing device 10a. The information processing unit 15a includes an authentication processing unit 151, an encryption processing unit 152, and a communication control unit 153a.

The basic functions of the information processing unit 15a are the same as the information processing unit 15 according to the first embodiment. In this embodiment, the storage unit 14a is different from that in the first embodiment, in that since the information processing unit 15a acquires information stored in the communication risk storage unit 141 and the permission period storage unit 144 from a communication risk storage unit 321 and a permission period storage unit 322 included in the management device 30 which will be described later because the storage unit 14a does not include the communication risk storage unit 141 and the permission period storage unit 144.

Referring back to FIG. 11, the management device 30 is, for example, a computer device such as a server device. The management device 30 manages the information processing system 1a. The management device 30 includes a management processing unit 31 and a management storage unit 32.

The management processing unit 31 is, for example, a processor including a CPU and comprehensively controls the management device 30. For example, the management processing unit 31 reads various types of information stored in the management storage unit 32 in response to a request from the information processing device 10a and transmits the read information to the information processing device 10a which is a request source. The management processing unit 31 transmits, for example, update information or an update program of the information processing device 10a to the information processing device 10a. For example, when the information processing device 10a is out of order, the management processing unit 31 contacts a person in charge of maintenance by e-mail or the like and prepares for repair of the information processing device 10a out of order.

The management storage unit 32 includes a communication risk storage unit 321 and a permission period storage unit 322.

The communication risk storage unit 321 stores a list of communication risks for parameters associated with the communication state of a counterpart information processing device 10. For example, the communication risk storage unit 321 stores values of the parameters and the communication risks in correlation with each other for each counterpart information processing device 10a. An example of data stored in the communication risk storage unit 321 will be described below with reference to FIG. 13.

FIG. 13 is a diagram illustrating an example of data stored in the communication risk storage unit 321 according to this embodiment.

As illustrated in FIG. 13, the communication risk storage unit 321 stores a "device ID," a "terminal ID," a "parameter name," a "parameter value," and a "communication risk" in correlation with each other. Here, the "device ID" is identification information for identifying an information processing device 10a, and the "terminal ID" is identification information for identifying a terminal device 20 connected to the information processing device 10a. The other information is the same as in the communication risk storage unit 141 illustrated in FIG. 3. The communication risk storage unit 321 according to this embodiment is different from the communication risk storage unit 141 according to the first embodiment, in that communication risk information for each counterpart information processing device 10a is stored.

Referring back to FIG. 12, the permission period storage unit 322 correlates a communication risk and a pass-through permission period (an example of a predetermined period) and stores the correlated information for each counterpart information processing device 10a. An example of data stored in the permission period storage unit 322 will be described below with reference to FIG. 14.

FIG. 14 is a diagram illustrating an example of data stored in the permission period storage unit 322 according to this embodiment.

As illustrated in FIG. 14, the permission period storage unit 322 stores a "device ID," a "communication risk," and a "pass-through permission period" in correlation with each other. The permission period storage unit 322 according to this embodiment is the same as the permission period storage unit 144 according to the first embodiment illustrated in FIG. 6, except that the "pass-through permission period" is set for each "device ID" (identification information of each counterpart information processing device 10*a*). The permission period storage unit 322 according to this embodiment is different from the permission period storage unit 144 according to the first embodiment, in that the pass-through permission period is stored for each counterpart information processing device 10*a*.

The communication control unit 153*a* of the information processing unit 15*a* according to this embodiment acquires communication risks on the basis of the values of the parameters corresponding to a counterpart information processing device 10*a*, for example, from the communication risk storage unit 321 of the management storage unit 32. The communication control unit 153*a* acquires the pass-through permission period corresponding to the counterpart information processing device 10*a* from the permission period storage unit 322 of the management device 30 on the basis of the acquired communication risks and determines the pass-through permission period. The other processes of the information processing unit 15*a* are the same as in the first embodiment and description thereof will be omitted.

As described above, in the information processing device 10*a* according to this embodiment, the information processing unit 15*a* determines the pass-through permission period on the basis of the communication risks for a counterpart terminal device which are acquired on the basis of the values of the parameters corresponding to the counterpart information processing device 10 from the communication risk storage unit 321 of the management device 30 which is provided in the outside.

Accordingly, similarly to the first embodiment, the information processing device 10*a* according to this embodiment can appropriately determine the pass-through permission period according to the communication risks.

In this embodiment, the communication risk storage unit 321 stores identification information of a counterpart information processing device 10*a*, the values of the parameters associated with the communication state, and the communication risks in correlation with each other.

Accordingly, the information processing device 10*a* according to this embodiment can change setting of the communication risks for each counterpart information processing device 10*a*.

In this embodiment, the permission period storage unit 322 stores identification information of a counterpart information processing device 10*a*, the communication risks, and the pass-through permission period in correlation with each other.

Accordingly, the information processing device 10*a* according to this embodiment can change the pass-through permission period for each counterpart information processing device 10*a*.

In this embodiment, an example in which the information processing device 10*a* does not include the communication risk storage unit 141 and the permission period storage unit 144 has been described above, but the information processing device 10*a* may include the communication risk storage unit 141 and the permission period storage unit 144. In this case, the information processing unit 15*a* may periodically store the information stored in the communication risk storage unit 321 and the permission period storage unit 322 of the management device 30 in the communication risk storage unit 141 and the permission period storage unit 144 for use.

Accordingly, the information processing device 10*a* according to this embodiment can appropriately perform information communication on the basis of newest information. The information processing system 1*a* can unitarily manage the communication risks and the pass-through permission period using the management device 30 and improve convenience.

(Third embodiment)

An information processing device 10*b* and an information processing system 1*b* according to a third embodiment will be described below with reference to the drawings.

In this embodiment, a modified example in which the information processing system 1*b* includes a management device 30*a* and the information processing device 10*b* includes an IC card 40 instead of the encryption processing unit 152 will be described.

Figure 15:
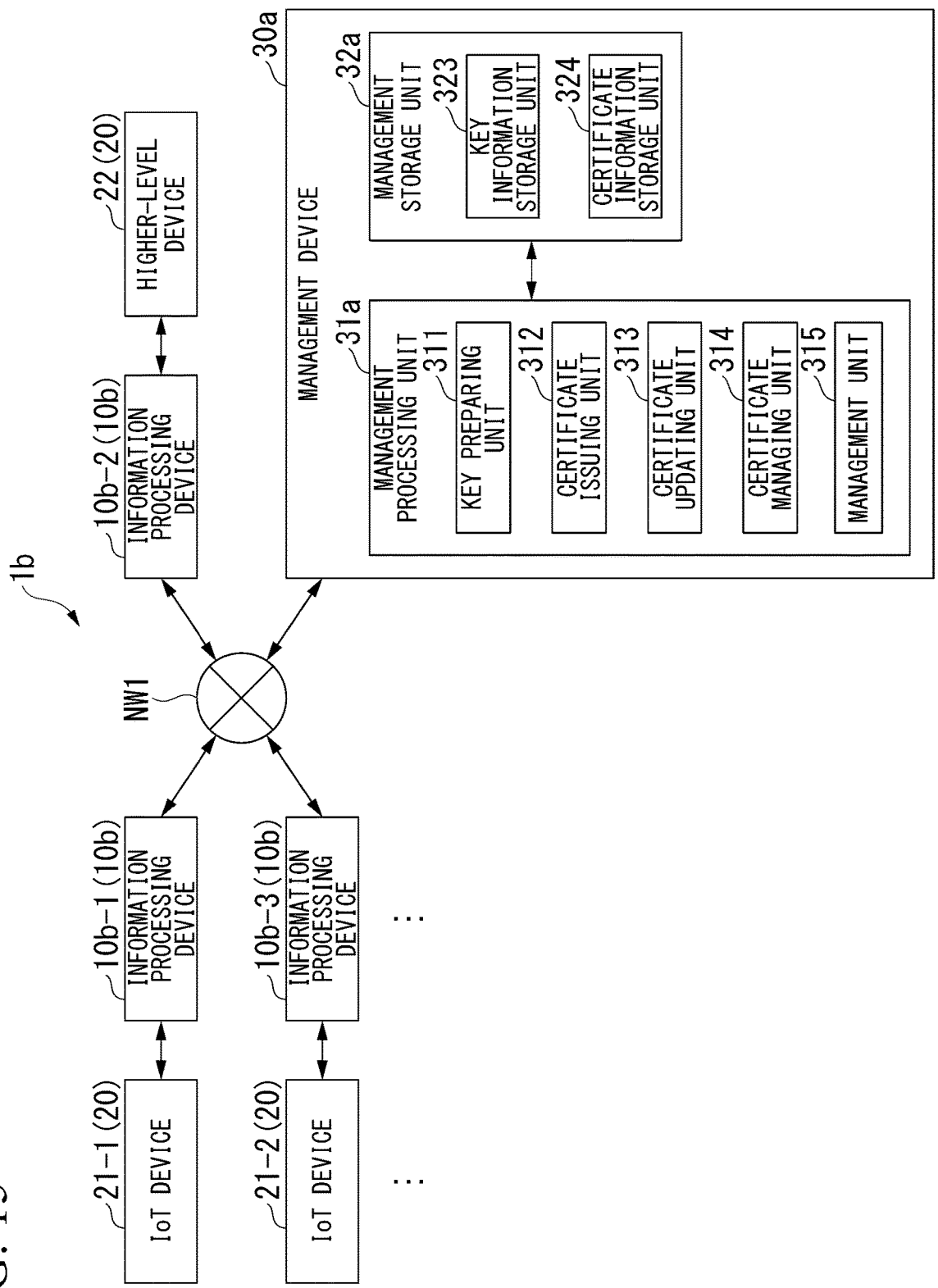
FIG. 15 is a block diagram illustrating an example of an information processing system according to a third embodiment.

FIG. 15 is a block diagram illustrating an example of the information processing system 1*b* according to the third embodiment.

As illustrated in FIG. 15, the information processing system 1*b* includes information processing devices (10*b*-1, 10*b*-2, 10*b*-3, . . . ), IoT devices (21-1, 21-2, . . . ), a higher-level device 22, and a management device 30*a*.

In this drawing, the same elements as in FIGS. 1 and 11 will be referred to by the same reference signs and description thereof will be omitted.

In this embodiment, the information processing device 10*b*-1, the information processing device 10*b*-2, and the information processing device 10*b*-3 have the same configuration, and are referred to as an information processing device 10*b* when an information processing device included in the information processing system 1*b* is simply indicated or when they are not distinguished.

The information processing device 10*b* is a communication control device that is connected between a terminal device 20 and a network NW1. The information processing device 10*b* adds security to communication between the terminal device 20 and the network NW1 and relays data communication.

As illustrated in FIG. 15, the information processing device 10*b*-1 is connected between the IoT device 21-1 and the network NW1, and the information processing device 10*b*-3 is connected between the IoT device 21-2 and the network NW1. The information processing device 10*b*-2 is connected between the higher-level device 22 and the network NW1.

In this embodiment, an example in which the IoT device 21-1 is used as a client device, the higher-level device 22 is used as a server device, and imaging data is transmitted from the client device to the server device will be described. In this embodiment, the information processing device 10*b*-1 is used as a client-side communication control device and the information processing device 10*b*-2 is used as a server-side communication control device. In this embodiment, the information processing device 10*b*-1 (the client-side communication control device) connected between the IoT device 21-1 (the client device) and the network NW1 encrypts data which is transmitted from the IoT device 21-1

(the client device) and outputs the encrypted data to the network NW1. The information processing device 10b-2 (the server-side communication control device) connected between the higher-level device 22 (the server device) and the network NW1 encrypts control data which is transmitted from the higher-level device 22 (the server device) and outputs the encrypted control data to the network NW1. Accordingly, it is possible to improve safety of imaging data transmitted over the network NW1 without changing the IoT device 21-1 (the client device) and the higher-level device 22 (the server device).

When data is transmitted to the higher-level device 22 (the server device), the information processing device 10b-1 (the client-side communication control device) encrypts data acquired from the IoT device 21-1 (the client device) and transmits the encrypted data to the higher-level device 22 (the server device).

When data is output to the IoT device 21-1 (the client device), the information processing device 10b-1 (the client-side communication control device) decrypts data acquired from the higher-level device 22 (the server device 22) via the information processing device 10b-2 (the server-side communication control device), and outputs the decrypted data to the information processing device 10b-1 (the client-side communication control device).

When data is transmitted to the IoT device (21-1 (the client device), the information processing device 10b-2 (the server-side communication control device) encrypts data acquired from the higher-level device 22 (the server device) and transmits the encrypted data to the IoT device 21-1 (the client device).

When data is output to the higher-level device 22 (the server device), the information processing device 10b-2 (the server-side communication control device) decrypts data acquired from the IoT device 21-1 (the client device) via the information processing device 10b-1 (the client-side communication control device), and outputs the decrypted data to the higher-level device 22 (the server device).

In this embodiment, for example, encryption based on a protocol of SSL/TLS (Transport Layer Security) is performed as encryption of data which is performed by the information processing device 10b-1 and the information processing device 10b-2 The information processing device 10b-1 and the information processing device 10b-2 encrypt data included in an HTTP and replaces the data with an HTTP Secure (HTTPS) protocol with improved safety, for example, by combining the SSL/TLS protocol with the HTTP.

The information processing device 10b-1 and the information processing device 10b-2 may replace the SSL/TLS protocol with a secure communication protocol with improved safety by combining the SSL/TLS protocol with various communication protocols. For example, the information processing device 10b-1 and the information processing device 10b-2 may replace a file transfer protocol (FTP) with an FTP secure (FTPS) protocol.

Figure 16:
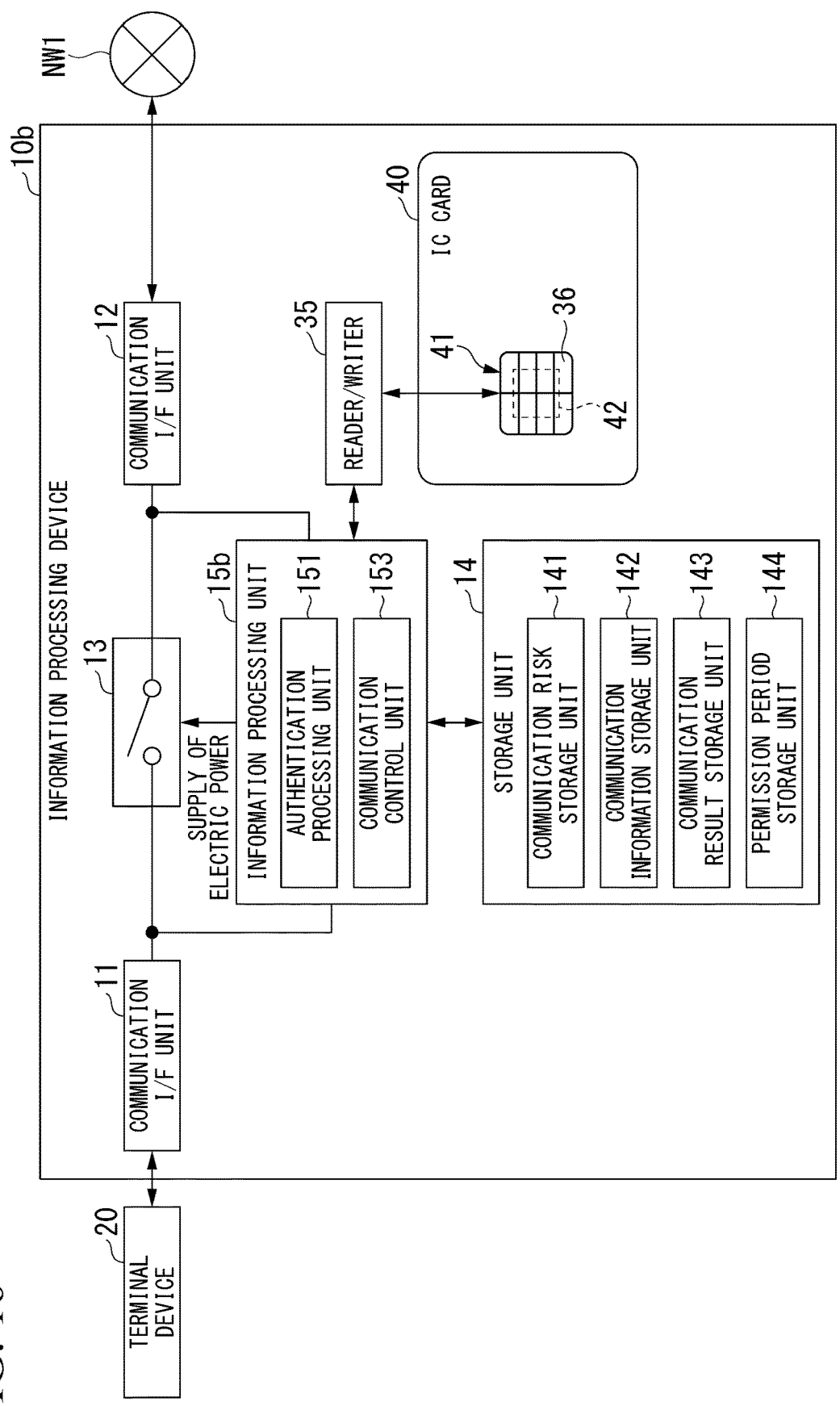
FIG. 16 is a block diagram illustrating an example of an information processing device according to the third embodiment.

FIG. 16 is a block diagram illustrating an example of the information processing device 10b according to this embodiment.

As illustrated in FIG. 16, the information processing device 10b includes a communication I/F unit 11, a communication I/F unit 12, a photo relay switch 13, a storage unit 14, an information processing unit 15b, a reader/writer 35, and an IC card 40.

In FIG. 16, the same elements as in FIG. 2 will be referred to by the same reference signs and description thereof will be omitted.

The information processing unit 15b is, for example, a processor including a CPU and comprehensively controls the information processing device 10b. The information processing unit 15b includes an authentication processing unit 151 and a communication control unit 153. The basic functions of the information processing unit 15b are the same as the information processing unit 15 according to the first embodiment, except that the encryption processing unit 152 is not provided and the function thereof is replaced with the IC card 40.

For example, when an authentication process such as cross authentication of ascertaining validity is performed between the host device and a counterpart information processing device 10, the authentication processing unit 151 in this embodiment communicates with the IC card 40 via the reader/writer 35 and performs the authentication process.

For example, when the communication I/F unit 11 receives data (plain text data) from a terminal device 20, the communication control unit 153 according to this embodiment causes the IC card 40 to encrypt the received data using a session key. The communication control unit 153 transmits the encrypted data (encryption data) to the counterpart information processing device 10 via the communication I/F unit 12 and the network NW1.

For example, when data (encryption data) is received from the counterpart information processing device 10 via the network NW1 and the communication I/F unit 12, the communication control unit 153 causes the IC card 40 to decrypt the received data using the session key. The communication control unit 153 transmits the decrypted data (plain text data) to the terminal device 20 via the communication I/F unit 11.

The reader/writer 35 communicates with the IC card 40 via a contact portion 36 of the IC card 40.

The IC card 40 (an example of an authentication unit) is formed, for example, by mounting an IC module 41 on a plastic card substrate. That is, the IC card 40 includes an IC module 41 and a card substrate in which the IC module 41 is embedded. The IC card 40 is detachably attached to the information processing device 10b and can communicate with the information processing device 10b via the contact portion 36 and the reader/writer 35.

For example, the IC card 40 receives a command (a process request) transmitted from the information processing device 10b via the reader/writer 35 via the contact portion 36, and performs a process (a command process) corresponding to the received command. Then, the IC card 40 transmits a response (a process response) which is an execution result of the command process to the information processing device 10b via the contact portion 36 and the reader/writer 35.

The IC module 41 includes the contact portion 36 and an IC chip 42. The contact portion 36 includes terminals for various signals required for operating of the IC card 40. Here, the terminals for various signals include terminals for receiving a source voltage, a clock signal, a reset signal, and the like from the reader/writer 35 and a serial data input/output terminal (an SIO terminal) for communicating with the reader/writer 35. The IC chip 42 is, for example, a large scale integration (LSI) such as a one-chip microprocessor.

Figure 17:
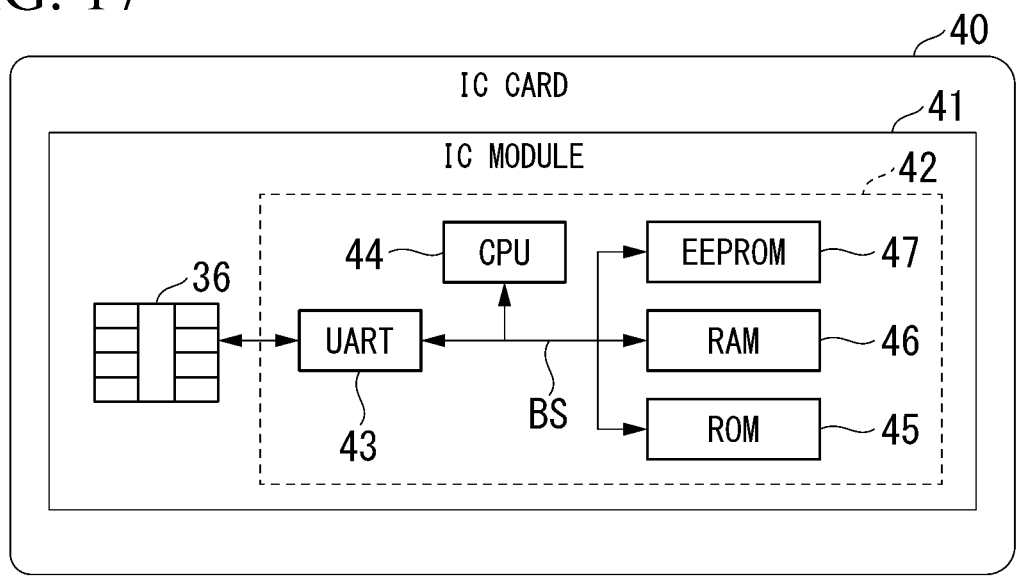
FIG. 17 is a diagram illustrating an example of a hardware configuration of an IC card 40 according to the third embodiment.

The hardware configuration of the IC card 40 will be described below with reference to FIG. 17. FIG. 17 is a diagram illustrating an example of a hardware configuration of the IC card 40 according to this embodiment.

The IC card 40 includes the contact portion 36 and the IC module 41 including the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM) 47. The constituents (43 to 47) are connected to each other via an internal bus BS.

The UART 43 performs serial data communication with the reader/writer 35 via the SIO terminal. The UART 43 outputs data (for example, data of 1 byte) acquired by parallel-converting a serial data signal received via the SIO terminal to the internal bus BS. The UART 43 serial-converts data acquired via the internal bus BS and outputs the converted data to the reader/writer 35 via the SIO terminal. For example, the UART 43 receives a command from the reader/writer 35 via the SIO terminal. The UART 43 transmits a response to the reader/writer 35 via the SIO terminal.

The CPU 44 performs various processes of the IC card 40 by executing a program stored in the ROM 45 or the EEPROM 47. For example, the CPU 44 performs a command process corresponding to the command received by the UART 43 via the contact portion 36.

The ROM 45 is, for example, a nonvolatile memory such as a mask ROM and stores programs for performing various processes of the IC card 40 and data such as a command table. The RAM 46 is, for example, a volatile memory such as a static RAM (SRAM) and temporarily stores data which is used to perform various processes of the IC card 40. The EEPROM 47 is, for example, an electrically rewritable nonvolatile memory. The EEPROM 47 stores various types of data which are used by the IC card 40. The EEPROM 47 stores, for example, information which is used for various services (applications) using the IC card 40.

Figure 18:
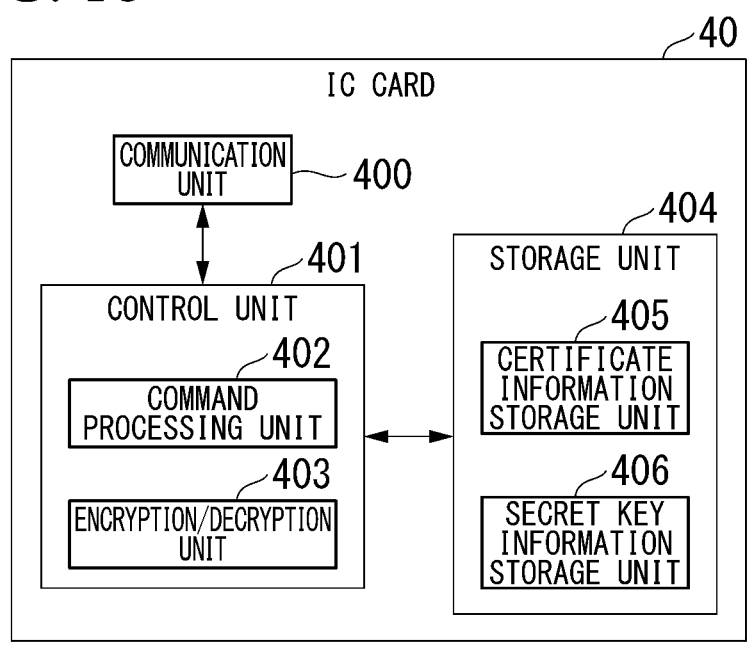
FIG. 18 is a block diagram illustrating an example of a functional configuration of the IC card 40 according to the third embodiment.

The configuration of the IC card 40 will be described below with reference to FIG. 18. FIG. 18 is a block diagram illustrating an example of a functional configuration of the IC card 40 according to this embodiment. The IC card 40 includes a communication unit 400, a control unit 401, and a storage unit 404. The functional units of the IC card 40 illustrated in FIG. 18 are realized by hardware of the IC card 40 illustrated in FIG. 17.

The communication unit 400 is realized, for example, by the UART 43, the CPU 44, and a program stored in the ROM 45 and, for example, transmits and receives a command and a response to and from the reader/writer 35 via the contact portion 36. That is, the communication unit 400 receives a command (a process request) for requesting a predetermined process from the reader/writer 35 and transmits a response (a process response) to the command to the reader/writer 35. The communication unit 400 stores reception data received from the reader/writer 35 via the UART 43 in the RANI 46. The communication unit 400 transmits transmission data stored in the RAM 46 to the reader/writer 35 via the UART 43.

The control unit 401 is realized, for example, by the CPU 44, the RAM 45, and the ROM 46 or the EEPROM 47 and comprehensively controls the IC card 40. The control unit 401 includes a command processing unit 402 and an encryption/decryption unit 403.

The process which is performed by the command processing unit 402 is an example of an "authentication process." The process which is performed by the encryption/decryption unit 403 is an example of an "encryption/decryption process."

The command processing unit 402 performs various command processes. For example, the command processing unit 402 performs an SSL/TLS handshake as a command process for requesting an HTTPS request which will be described later. In the SSL/TLS handshake, exchange of key information or the like required for encrypted communication and cross authentication with a device of a communication destination is performed. Here, for example, cross authentication is an authentication process of allowing the information processing device 10*b*-1 (the client-side communication control device) connected to the IoT device 21-1 (the client device) illustrated in FIG. 15 and the information processing device 10*b*-2 (the server-side communication control device) connected to the higher-level device 22 (the server device) to mutually ascertain whether the counterparts are validly authenticated devices before performing communication with each other.

The encryption/decryption unit 403 performs a process of encrypting data and a process of decrypting encrypted data. The encryption/decryption unit 403 encrypts data which is output from a device (the IoT device 21-1 or the higher-level device 22) having acquired the data via the communication unit 400. The encryption/decryption unit 403 decrypts encrypted data from the network NW1 acquired via the communication unit 400.

The storage unit 404 is, for example, a storage unit constituted by the EEPROM 47 and includes a certificate information storage unit 405 and a secret information storage unit 406. The certificate information storage unit 405 stores a certificate for a device (the IoT device 21-1 or the higher-level device 22) which has been issued by the management device 30*a*. Specifically, information indicating a client certificate is stored in the certificate information storage unit 405 of the IC card 40 which is attached to the information processing device 10*b*-1 connected to the IoT device 21-1 (the client device). Information indicating a server certificate is stored in the certificate information storage unit 405 of the IC card 40 which is attached to the information processing device 10*b*-2 connected to the higher-level device 22 (the server device).

The secret information storage unit 406 stores a secret key for the device (the IoT device 21-1 or the higher-level device 22) which has been issued by the management device 30. Specifically, information indicating a secret key issued for the information processing device 10*b*-1 (the client-side communication control device) is stored in the secret information storage unit 406 of the IC card 40 which is attached to the information processing device 10*b*-1 connected to the IoT device 21-1 (the client device). Information indicating a secret key issued for the information processing device 10*b*-2 (the server-side communication control device) is stored in the secret information storage unit 406 of the IC card 40 which is attached to the information processing device 10*b*-2 connected to the higher-level device 22 (the server device).

Referring back to FIG. 15, the management device 30*a* is, for example, a computer device such as a server device and manages the information processing system 1*b*. The management device 30*a* issues a client certificate and a secret key for the information processing device 10*b*-1. For example, the management device 30*a* issues an IC card 40 storing a client certificate and a secret key. The management device 30*a* transmits the client certificate and the secret key stored in the IC card 40 to the information processing device 10*b*-1 to which the IC card 40 is attached via the network NW1.

The management device 30*a* issues a server certificate and a secret key for the information processing device 10*b*-2. For example, the management device 30*a* issues an IC card storing a server certificate and a secret key. The management device 30*a* transmits the server certificate and the secret key stored in the IC card 40 to the information processing device 10b-2 to which the IC card 40 is attached via the network NW1. The client certificate, the server certificate, and the secret key are information required to determine a common key (a session key) which is used for the information processing device 10b-1 and the information processing device 10b-2 to perform encryption communication.

The management device 30a includes, for example, a management processing unit 31b and a management storage unit 32a.

The management processing unit 31b is, for example, a processor including a CPU and comprehensively controls the management device 30a. The management processing unit 31b mainly serves as a private authentication station that ascertains validity of the information processing devices 10b (10b-1, 10b-2, . . . ). The management processing unit 31b includes a key preparing unit 311, a certificate issuing unit 312, a certificate updating unit 313, a certificate managing unit 314, and a management unit 315.

For example, the key preparing unit 311 issues a secret key corresponding to a public key included in a certificate which will be described later on the basis of an authentication request from the information processing device 10b-1 (10b-2).

For example, the certificate issuing unit 312 issues a certificate for certificating validity of the information processing device 10b-1 (10b-2) on the basis of an authentication request from the information processing device 10b-1 (10b-2). The certificate includes a public key and information indicating an owner of the information processing device 10b-1 (10b-2).

The certificate updating unit 313 updates a certificate by setting a new expiration date for an expired certificate. For example, the certificate updating unit 313 issues a certificate by extending an expiration date of a certificate issued for an information processing device 10b-1 (10b-2) on the basis of an update request from the information processing device 10b-1 (10b-2), and transmits the issued certificate to the information processing device 10b-1 (10b-2) When the information indicating the issued certificate is received by the information processing device 10b-1 (10b-2) and is stored in the certificate information storage unit 405 of the IC card 40 of the information processing device 10b-1 (10b-2), the expiration date of the certificate of the information processing device 10b-1 (10b-2) is extended.

The certificate managing unit 314 manages a certificate which has been already issued. The certificate managing unit 314 performs a process of invalidating the certificate issued for the information processing device 10b-1 (10b-2), for example, when validities are not mutually verified in cross authentication due to falsification or theft of the IC card 40 attached to the information processing device 10b-1 (10b-2) or the like. The certificate managing unit 314 may transmit a response indicating whether certificates issued for the information processing device 10b-1 (10b-2) and other communication devices have been issued by the certificate managing unit 314, for example, on the basis of an inquiry from the information processing device 10b-1 (10b-2). The certificate managing unit 314 may periodically ascertain whether the issued certificates are used in the valid information processing device 10b-1 (10b-2).

The management unit 315 manages the information processing devices 10b (10b-1, 10b-2, . . . ). For example, the management unit 509 remotely controls cross authentication which is performed by the information processing device 10b-1 (10b-2) via the network NW1.

The management storage unit 32a includes, for example, a key information storage unit 323 and a certificate information storage unit 324. The key information storage unit 323 stores, for example, information indicating a public key or a secret key which has been already issued. The certificate information storage unit 324 stores, for example, information indicating a certificate which has been already issued.

The key information storage unit 323 and the certificate information storage unit 324 are referred to, for example, when the key preparing unit 311 issues a secret key and when the certificate issuing unit 312 issues a certificate. Information indicating the secret key issued by the key preparing unit 311 is stored in the key information storage unit 323. Information indicating the certificate issued by the certificate issuing unit 312 is stored in the certificate information storage unit 324.

The operations of the information processing system 1 according to this embodiment will be described below with reference to the drawings.

Figure 19:
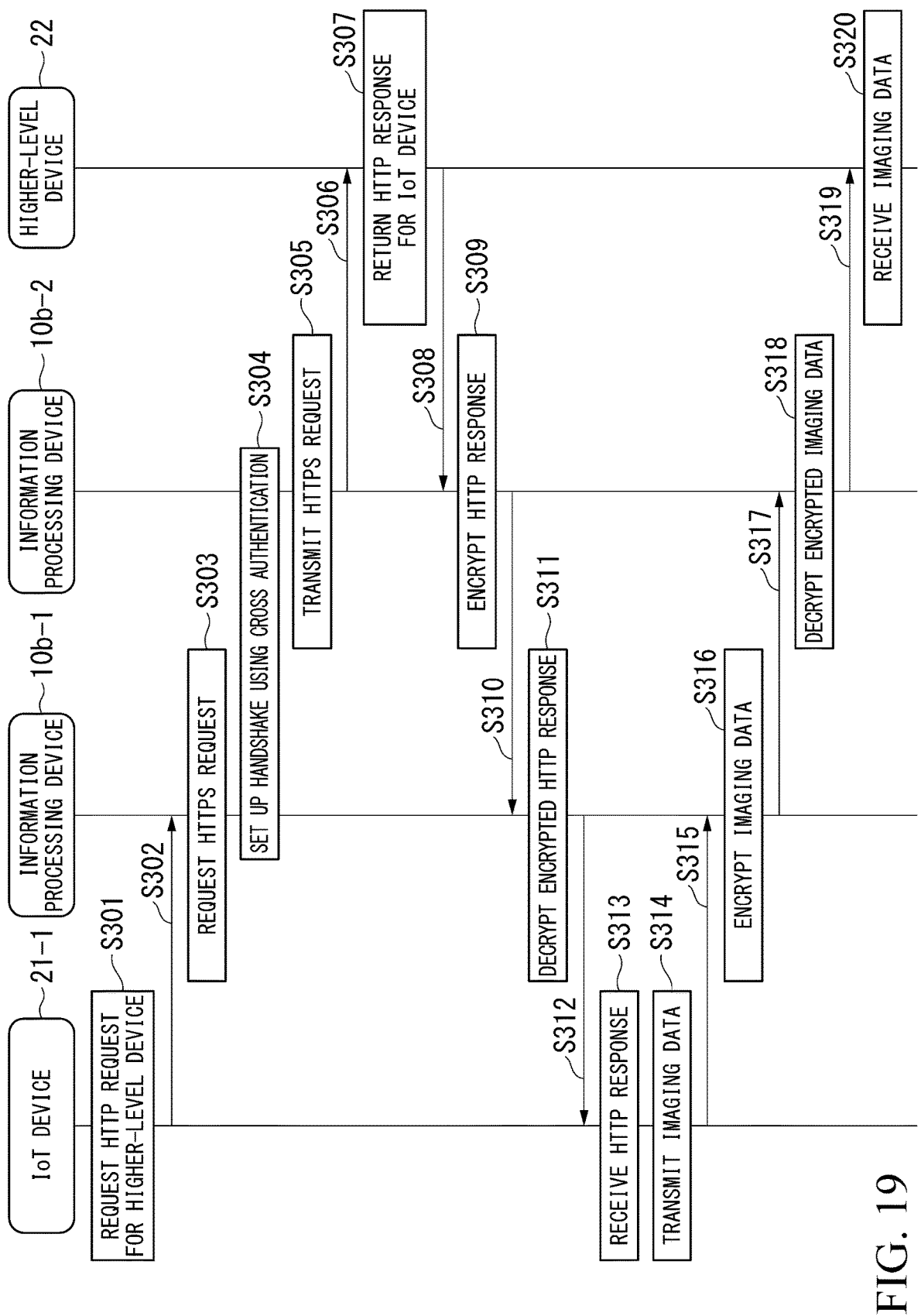
FIG. 19 is a diagram illustrating an example of a secret communication operation of the information processing system according to the third embodiment.

FIG. 19 is a diagram illustrating an example of a secret communication operation of the information processing system 1b according to this embodiment. In this drawing, an example in which communication between the IoT device 21-1 (the client device) and the higher-level device 22 (the server device) is performed as secret communication using the information processing device 10b-1 (the client-side communication control device) and the information processing device 10b-2 (the server-side communication control device) is illustrated.

In FIG. 19, when imaging data is transmitted to the higher-level device 22 (the server device), the IoT device 21-1 (the client device) first transmits an HTTP request for the higher-level device 22 (Step S301). The HTTP request transmitted from the IoT device 21-1 is acquired by the information processing device 10b-1 (the client-side communication control device) (Step S302).

When the HTTP request transmitted from the IoT device 21-1 is acquired, the information processing device 10b-1 transmits an HTTPS request (ClientHello) to the information processing device 10b-2 (the server-side communication control device) (Step S303). Accordingly, a handshake between the information processing device 10b-1 and the information processing device 10b-2 is started (Step S304).

Specifically, the HTTPS request (ClientHello) transmitted from the information processing device 10b-1 includes, for example, a version of TLS and information indicating an encryption mode used for communication, and an algorithm list. The information processing device 10b-2 transmits an HTTPS response (ServerHello) to the information processing device 10b-1 as a response to ClientHello. The HTTPS response (ServerHello) transmitted from the information processing device 10b-2 includes, for example, information which is selected out of choices presented in ClientHello by the higher-level device 22. In other words, a specific encryption algorithm in communication is determined by allowing the information processing device 10b-2 to select a choice out of choices presented from the information processing device 10b-1.

Then, the information processing device 10b-2 transmits information required for a common key which is used for encryption communication. The information required for a common key includes, for example, information indicating a public key issued for the higher-level device 22 and a certificate thereof and information for requesting transmission of a public key of the IoT device 21-1 and a certificate thereof. The information processing device 10b-1 transmits the public key issued for the host vehicle, the certificate thereof, and information required for the public key used for encryption communication to the information processing device 10b-2.

Cross authentication between the information processing device 10b-1 and the information processing device 10b-2 is performed, for example, as follows. The information processing device 10b-1 generates a signature on the basis of ServerHello which has been received up to now or the like and transmits the generated signature to the information processing device 10b-2. The information processing device 10b-2 verifies the signature received from the information processing device 10b-1 on the basis of the certificate received from the information processing device 10b-1. When the verification succeeds, the information processing device 10b-2 determines that the certificate validly belongs to the information processing device 10b-1. The information processing device 10b-2 generates a signature from ClientHello which has been received up to now or the like and transmits the generated signature to the information processing device 10b-1. The information processing device 10b-1 verifies the signature received from the information processing device 10b-2 on the basis of the certificate received from the information processing device 10b-2. When the verification succeeds, the information processing device 10b-1 determines that the certificate validly belongs to the information processing device 10b-2.

When cross authentication between the information processing device 10b-1 and the information processing device 10b-2 is successfully performed, the information processing device 10b-1 and the information processing device 10b-2 generate and exchange a common key which is used for encryption.

When the public key issued for the higher-level device 22 and the certificate thereof transmitted from the information processing device 10b-2 are a certificate which is allowed by the information processing device 10b-1 and when the public key and the certificate thereof transmitted from the information processing device 10b-1 are a certificate which is allowed by the information processing device 10b-2, the information processing device 10b-2 ends the handshake.

When the handshake with the information processing device 10b-1 is set up, the information processing device 10b-2 transmits an HTTP request to the higher-level device 22 (Step S305). The HTTP request is an HTTP request which is transmitted from the IoT device 21-1 in Step S301.

The HTTP request transmitted from the information processing device 10b-2 is received by the higher-level device 22 (Step S306). At this time, the higher-level device 22 recognizes that the HTTP request has been requested from the IoT device 21-1. Accordingly, the higher-level device 22 returns an HTTP response to the IoT device 21-1 (Step S307). The HTTP response transmitted from the higher-level device 22 is acquired by the information processing device 10b-2 (Step S308).

The information processing device 10b-2 encrypts the HTTP response acquired from the higher-level device 22 using the common key determined in the handshake of Step S304 (Step S309). The HTTP response encrypted by the information processing device 10b-2 is received by the information processing device 10b-1 via the network NW1 (Step S310). The information processing device 10b-1 decrypts the received HTTP response using the common key (Step S311). The HTTP response decrypted by the information processing device 10b-1 is acquired by the IoT device 21-1 (Step S312). The IoT device 21-1 receives the decrypted HTTP response (Step S313) At this time, the IoT device 21-1 recognizes that the HTTP response is returned from the higher-level device 22. Accordingly, the IoT device 21-1 transmits imaging data to the higher-level device 22 (Step S314).

The imaging data transmitted from the IoT device 21-1 is acquired by the information processing device 10b-1 (Step S315). The information processing device 10b-1 encrypts the imaging data transmitted from the IoT device 21-1 using the common key (Step S316). The imaging data encrypted by the information processing device 10b-1 is received by the information processing device 10b-2 via the network NW1 (Step S317).

The information processing device 10b-2 decrypts the received imaging data using the common key (Step S318). The imaging data decrypted by the information processing device 10b-2 is acquired by the higher-level device 22 (Step S319). The higher-level device 22 receives the decrypted imaging data (Step S320). At this time, the higher-level device 22 recognizes that the imaging data from the IoT device 21-1 is received.

In Step S304 of the flowchart, when cross authentication between the information processing device 10b-1 and the information processing device 10b-2 has not been successfully performed, the information processing device 10b-1 does not permit communication with a communication destination. Specifically, the information processing device 10b-1 does not output information transmitted from the communication destination to the IoT device 21-1. This is because, when cross authentication has not been successfully performed, there is a likelihood that the communication destination is an unauthorized communication device which pretends to the information processing device 10b-2. In this case, for example, the information processing device 10b-1 may transmit a communication record when cross authentication has not been successfully performed to the management device 30a. Accordingly, the management device 30a can acquire the communication record when cross authentication has not been successfully performed, and monitor of an abnormality in the network NW1 by ascertaining a pattern or frequency of unauthorized communication with the information processing device 10b-1 under the management thereof.

The information processing device 10b-1 may determine whether to permit communication with the communication destination on the basis of a transmission destination list indicating information of communication devices of which communication with the IoT device 21-1 is permitted instead of cross authentication in the handshake which is performed in Step S304 of FIG. 19. The information of communication devices in the transmission destination list is, for example, uniform resource locators (URLs) The information processing unit 15b of the information processing device 10b-1 permits communication with a communication destination when the URL of the communication destination is a URL registered in the transmission destination list, and does not permit the communication when the URL of the communication destination is not registered in the transmission destination list.

The information processing unit 15b may update the transmission destination list. The information processing unit 15b stores, for example, URLs of communication destinations of which communication with the IoT device 21-1 is permitted during a predetermined period and URLs of communication destinations of which communication is not permitted. Then, for example, the information processing unit 15b updates the transmission destination list by registering the URL of a communication destination of which communication has been performed during the predetermined period out of the URLs registered in the transmission destination list again. Alternatively, the information processing device 10b-1 may transmit the communication destination URLs of which communication is permitted during the predetermined period and the communication destination URLs of which communication is not permitted to the management device 30a. In this case, for example, the management device 30a may update the transmission destination list on the basis of the communication destination URLs which have communicated with the information processing device 10b-1. When the transmission destination list is updated by the management device 30a, the management device 30a can unitarily manage communication devices which communicate with the information processing device 10b-1 under the management thereof.

The information processing device 10b-1 may verify whether details of information (for example, an update program of firmware) transmitted to the IoT device 21-1 is valid after the handshake which is performed in Step S304 of FIG. 19 has been set up. For example, when an update program of firmware for the IoT device 21-1 is transmitted via the network NW1, the information processing unit 15b of the information processing device 10b-1 verifies the update program of firmware using a key for verification (a verification key). In this case, for example, the management device 30a may transmit the verification key to the information processing device 10b-1 and the information processing device 10b-2.

For example, the information processing device 10b-2 generates a hash value from information (plain text) transmitted to the IoT device 21-1 and encrypts the generated hash value using the verification key. Then, the information processing device 10b-2 further encrypts the plain text and the encrypted hash value using a secret key and transmits the encrypted data to the IoT device 21-1. The information processing device 10b-1 decrypts the information using a common key and acquires the plain text and the encrypted hash value.

The information processing device 10b-1 generates a hash value from the acquired plain text and decrypts the encrypted hash value using the verification key. When the hash value generated from the plain text and the decrypted hash value are the same, the information processing device 10b-1 determines that the information transmitted to the IoT device 21-1 has valid details. In this case, the information processing device 10b-1 outputs the decrypted information (plain text) to the IoT device 21-1. On the other hand, when the hash value generated from the plain text and the decrypted hash value are not the same, the information processing device 10b-1 determines that there is a likelihood that the information transmitted to the IoT device 21-1 will be unauthorized information transmitted from an unauthorized communication device which pretends to the higher-level device 22 or the information processing device 10b-2. In this case, the information processing device 10b-1 does not output the decrypted information (plain text) to the IoT device 21-1.

Accordingly, the IoT device 21-1 can receive only information which has been verified to be valid. In general, the IoT device 21-1 is thought to determine whether details of the update program for updating firmware are valid, but the information processing device 10b-2 instead of the IoT device 21-1 can verify details of the information transmitted to the IoT device 21-1, whereby it is possible to reduce a processing burden on the IoT device 21-1.

The operation of the degeneracy function of the information processing device 10b according to this embodiment is the same as that in the first embodiment and description thereof will be omitted.

As described above, the information processing system 1b according to this embodiment includes the information processing device 10b-1 that is connected between the IoT device 21-1 and the network NW1 and the information processing device 10b-2 that is connected between the IoT device 21-1 and the network NW1. The information processing device 10b-1 includes the IC card 40 and the information processing unit 15b. The information processing unit 15b requests the IC card 40 to perform at least one of a cross authentication process and an encryption/decryption process, transmits encrypted information to the information processing device 10b-2, and transmits decrypted information to the IoT device 21-1. The information processing device 10b-2 includes the IC card 40 and the information processing unit 15b. The information processing unit 15b requests the IC card 40 to perform at least one of a cross authentication process and an encryption/decryption process, transmits encrypted information to the information processing device 10b-2, and transmits decrypted information to the higher-level device 22. In this case, the information processing unit 15b of the information processing device 10b may cause the IC card 40 to perform only the cross authentication process, to perform only the encryption/decryption process, or to perform both the cross authentication process and the encryption/decryption process.

Accordingly, the information processing system 1b according to this embodiment can improve safety of a social infrastructure system, for example, without changing the social infrastructure system. This is because imaging data (so-called plain text) of the HTTP protocol transmitted from the information processing device 10b-1 to the higher-level device 22 is combined, for example, with the SSL/TLS protocol and is replaced with the HTTPS with improved safety by the information processing device 10b-1. Since control data transmitted from the higher-level device 22 to the IoT device 21-1 is encrypted, decrypted by the information processing device 10b-1, and received by the IoT device 21-1, the IoT device 21-1 does not need to perform a decryption process and an existing device can be used without any change.

In the information processing system 1b according to this embodiment, since the information processing device 10b-1 and the information processing device 10b-2 perform cross authentication, it is possible to further improve safety in comparison with a case in which unidirectional authentication is performed. With general client terminals and a server terminal, since a plurality of unspecified client terminals communicate with the server terminal, it is not realistic to issue valid client certificates for the plurality of unspecified client terminals and to continuously manage the certificates. However, in a social infrastructure system, the relationship between the IoT device 21-1 and the higher-level device 22 is clearly specified. Accordingly, the information processing device 10b-1 and the information processing device 10b-2 can perform cross authentication and it is possible to improve safety.

In this embodiment, secure communication using the SSL/TLS protocol may be normally performed or whether to perform communication using the SSL/TLS protocol may be selected. Only unidirectional communication of bidirectional communication between the IoT device 21-1 (the client device) and the higher-level device 22 (the server device) may be set to communication using the SSL/TLS protocol. Secure communication using the SSL/TLS protocol may be normally performed or whether to perform communication using the SSL/TLS protocol may be selected.

By normally performing communication using the SSL/TLS protocol, it is possible to cut off communication from a device other than an authorized information processing device 10b authenticated by the information processing device 10b. Accordingly, it is possible to curb an unauthorized access to the IoT device 21-1 (the client device) or the higher-level device 22 (the server device) or infection of the IoT device 21-1 (the client device) or the higher-level device 22 (the server device) with malware.

In the information processing system 1b according to this embodiment, the information processing device 10b may periodically ascertain whether connection to the IoT device 21-1 (the client device) connected to the host device or the higher-level device 22 (the server device) is maintained. In this case, information indicating a connection state may be transmitted to the management device 30a. When information indicating a connection state is not received from the information processing device 10b or the like, the management device 30a determines that the information processing device 10b is separated from the IoT device 21-1 (the client device) or the higher-level device 22 (the server device) and invalidates the separated information processing device 10b. Accordingly, the management device 30a can curb connection of the separated information processing device 10b to an unauthorized device and use for impersonation.

In the information processing system 1b according to this embodiment, a program of the IoT device 21-1 (the client device) may be updated from the higher-level device 22 (the server device), the management device 30a, or the like via the information processing device 10b. By updating a program (firmware update) via the information processing device 10b, it is possible to safely update the functions of the IoT device 21-1 (the client device). When firmware is transmitted from the higher-level device 22 (the server device) to the IoT device 21-1 (the client device) in this way, for example, a signature of the higher-level device 22 (the server device) encrypted by the information processing device 10b-2 (the server-side communication control device) is added to firmware transmitted from the higher-level device 22 (the server device).

In this case, when the signature is decrypted by the information processing device 10b-1 (the client-side communication control device), the IoT device 21-1 (the client device) can determine that the transmitted firmware is validly firmware transmitted from the higher-level device 22 (the server device). Accordingly, even when invalid firmware is transmitted from an unauthorized terminal which pretends to the higher-level device 22 (the server device) to the IoT device 21-1 (the client device), it is possible to prevent erroneous update based on invalid firmware from being performed on the IoT device 21-1 (the client device).

In the information processing system 1b according to this embodiment, starting or stopping of the IoT device 21-1 (the client device) may be performed from the higher-level device 22 (the server device), the management device 30a, or the like via the information processing device 10b. By performing starting or stopping (remote activation) via the information processing device 10b, it is possible to update the functions of the IoT device 21-1 (the client device) and to realize secure remote control.

In the information processing system 1b according to this embodiment, an example in which the IoT device 21-1 (the client device) and the higher-level device 22 (the server device) communicate with each other in a wired manner has been described above, but the invention is not limited thereto. At least one of the IoT device 21-1 (the client device) and the higher-level device 22 (the server device) may be a device that performs wireless communication using a wireless LAN. For example, when the IoT device 21-1 (the client device) communicates with the higher-level device 22 (the server device) in a wireless manner, the information processing device 10b-1 has a wireless communication function, encrypts data transmitted from the IoT device 21-1 (the client device), and transmits the encrypted data to the higher-level device 22 (the server device) in a wireless manner.

In the information processing system 1b according to this embodiment, an example in which the information processing device 10b-1 communicates with the information processing device 10b-2 has been described above, but the communication destination of the information processing device 10b-1 is not limited thereto. For example, the information processing device 10b-1 may communicate with the information processing device 10b-3. When a communication start signal is received from the information processing device 10b-3, the information processing device 10b-1 first performs cross authentication with the information processing device 10b-3 and ascertains whether the information processing device 10b-3 is an authorized communication terminal. When the cross authentication has been successfully performed, the information processing device 10b-1 outputs information received from the information processing device 10b-3 to the IoT device 21-1. By adding an authenticator to transmission data using an encryption key, detection of falsification of communication information and identification of a transmitter become possible. Accordingly, in the information processing system 1b according to this embodiment, it is possible to ascertain whether "valid data" is received from an "authorized counterpart" in communication between the information processing devices 10b.

In the aforementioned embodiments, the encryption processing unit 152 may use a hardware security module (HSM), a secure application module (SAM), the IC card 40, or the like. For example, the encryption processing unit 152 may be configured to be attachable and detachable using the IC card 40 or the like.

In the aforementioned embodiments, for example, an example in which the information processing devices 10 (10a, 10b) are applied to communication between the IoT device 21-1 and the higher-level device 22 has been described above, but the invention is not limited thereto. For example, regarding the information processing devices 10 (10a, 10b), the information processing devices 10 (10a, 10b) may be applied to communication between the IoT device 21-1 and the IoT device 21-2, or may be applied to communication between other terminal devices 20.

In the aforementioned embodiments, an example in which the information processing unit 15 (15a, 15b) detects whether the pass-through mode is set on the basis of communication information with a counterpart information processing device 10 (10a, 10b) stored in the communication information storage unit 142 has been described above, but the invention is not limited thereto. For example, the communication information storage unit 142 may store communication information with a terminal device 20 connected to the counterpart information processing device 10 (10a, 10b) and the information processing unit 15 (15a, 15b) may detect whether the pass-through mode is set on the basis of the communication information with the terminal device 20. That is, information processing unit 15 (15a, 15b) may determine that the counterpart information processing device 10 (10*a*, 10*b*) is in the pass-through mode when the communication information in current communication matches the communication information with the terminal device 20.

The information processing unit 15 (15*a*, 15*b*) may detect, for example, an attack such as impersonation or falsification from a third party or an abnormality such as infection with malware or virus using the communication information stored in the communication information storage unit 142.

In the aforementioned embodiments, an example in which, when communication risks corresponding to a plurality of parameters are used, the information processing unit 15 (15*a*, 15*b*) determines the total risk by majority or using the highest communication risk has been described above, but the invention is not limited thereto. The information processing unit 15 (15*a*) may determine the total risk, for example, on the basis of an average value of the communication risks or determine the total risk on the basis of a sum value with weights or an average value.

In the aforementioned embodiments, the photo relay switch 13 is used as an example of the switching unit, but another switch may be used as long as it is a normally closed switch and a turn-on state thereof can be maintained when supply of electric power is stopped.

An example in which the third embodiment is applied to the information processing system 1 according to the first embodiment, but may be applied to the second embodiment.

According to at least one of the aforementioned embodiments, the information processing system includes the information processing unit 15 that encrypts received information and transmits the encrypted information to the network NW1 via the communication I/F unit 12 when at least the communication I/F unit 11 receives information from a terminal device 20 and that decrypts received information and transmits the decrypted information to the terminal device 20 via the communication I/F unit 11 when at least the communication I/F unit 12 receives information from the network NW1 and the photo relay switch 13 (a switching unit) that directly connects a communication line of the communication I/F unit 11 with the terminal device 20 and a communication line of the communication I/F unit 12 with the network NW1 and switches to the pass-through mode in which the terminal device 20 and the network NW1 communicate directly with each other without using the information processing unit 15 when the information processing unit 15 comes into a disabled state including at least supply of electric power thereto being stopped. Accordingly, it is possible to secure the security thereof and to improve the availability.

The aforementioned embodiments can also be described as follows:

An information processing device includes:
a first communication unit connectable to a terminal device connectable to a network and configured to communicate with the terminal device;
a second communication unit connectable to the network and configured to communicate via the network with a device connected to the network;
a storage unit configured to store at least a program which is able to be executed by a computer;
a hardware processor that executes the program stored in the storage unit; and
a switch that directly connects a communication line of the first communication unit with the terminal device and a communication line of the second communication unit with the network and switches to a pass-through mode in which the terminal device and the network communicate directly with each other without using the information processing unit when the hardware processor comes into a disabled state including at least supply of electric power thereto being stopped,
wherein the hardware processor executes the program to perform a process of encrypting received information and transmitting the encrypted information to the network via the second communication unit when at least the first communication unit receives information from the terminal device and decrypting received information and transmitting the decrypted information to the terminal device via the first communication unit when at least the second communication unit receives encrypted information from the network.

The processes of the constituent units of the information processing system 1 (1*a*) and the information processing device 10 (10*a*) according to the aforementioned embodiments may be performed by recording a program for realizing the functions of the constituent units of the information processing system 1 (1*a*) and the information processing device 10 (10*a*) on a computer-readable recording medium and causing a computer system to read and execute the program recorded on the recording medium. Here, "causing a computer system to read and execute a program recorded on a recording medium" includes installing the program in the computer system. The "computer system" mentioned herein may include an operating system (OS) or hardware such as peripherals.

Examples of the "computer-readable recording medium" include a portable medium such as a flexible disk, a magneto-optical disc, a ROM, or a CD-ROM and a storage device such as a hard disk incorporated in a computer system.

While some embodiments of the invention have been described above, these embodiments are presented as examples and are not intended to limit the scope of the invention. The embodiments can be modified in various other forms and can be subjected to various omissions, substitutions, and alterations without departing from the gist of the invention. The embodiments and modifications thereof are included in the scope or gist of the invention and are also included in the configurations described in the appended claims and the scopes equivalent thereto.

What is claimed is:

1. An information processing device comprising:
a first communication unit connectable to a terminal device which is connectable to a network and configured to communicate with the terminal device;
a second communication unit connectable to the network and configured to communicate via the network with a device connected to the network;
an information processing unit configured to encrypt information, when at least the first communication unit receives information from the terminal device, and to transmit the encrypted information to the network via the second communication unit, and the information processing unit configured to decrypt the encrypted information, when at least the second communication unit receives the encrypted information from the network, and to transmit the decrypted information to the terminal device via the first communication unit; and
a switching unit configured to directly connect a communication line between the first communication unit and the terminal device to another communication line between the second communication unit and the network, when the information processing unit comes into an inoperable state including at least electric power supply stop state, and to switch into a pass-through mode in which the terminal device and the network communicate directly with each other without through the information processing unit;

wherein if a counterpart information processing device comes into the pass-through mode where the counterpart information processing device includes a first communication unit, a second communication unit, an information processing unit, and a switching unit, and where the counterpart information processing device is connected between the network and a counterpart terminal device with which the terminal device communicates via the network, then the information processing unit permits the counterpart information processing device to communicate with the counterpart terminal device in a predetermined time period on the basis of parameters related to a communication state of the counterpart information processing device and restrict the counterpart information processing device from communicating with the counterpart terminal device after the predetermined time period has elapsed.

2. The information processing device according to claim 1, wherein the information processing unit determines the predetermined time period on the basis of a communication risk for the counterpart terminal device, where the communication risk is acquired from a communication risk storage unit on the basis of values of the parameters associated with the counterpart information processing device, and where the communication risk storage unit stores the values of the parameters and the communication risks in association with each other.

3. The information processing device according to claim 1, wherein the parameters include a communication result of the counterpart information processing device, and wherein the information processing unit determines the predetermined period on the basis of the communication result.

4. The information processing device according to claim 1, wherein the parameters include an estimated restoration time until the pass-through mode of the counterpart information processing device is released, and wherein the information processing unit determines the predetermined time period on the basis of the estimated restoration time.

5. The information processing device according to claim 1, wherein the parameters include an exploitability score indicating easiness of an attack over the network, and wherein the information processing unit determines the predetermined period on the basis of the exploitability score over the network.

6. The information processing device according to claim 1, wherein the information processing unit detects whether the counterpart information processing device comes into the pass-through mode on the basis of at least one of a communication method in communication with the counterpart information processing device, an authentication mode, and identification information of the counterpart information processing device.

7. The information processing device according to claim 6, further comprising:

a communication information storage unit that stores communication information including at least one of a communication method of communication with the counterpart information processing device, an authentication method, and identification information of the counterpart information processing device, wherein the information processing unit detects whether the counterpart information processing device comes into the pass-through mode on the basis of the communication information stored in the communication information storage unit.

8. An information processing system comprising:

a plurality of terminal devices; and a plurality of information processing devices connected between the plurality of terminal devices and a network, wherein the information processing device comprises:

a first communication unit connectable to a terminal device which is connectable to a network and configured to communicate with the terminal device;

a second communication unit connectable to the network and configured to communicate via the network with a device connected to the network;

an information processing unit configured to encrypt information, when at least the first communication unit receives information from the terminal device, and to transmit the encrypted information to the network via the second communication unit, and the information processing unit configured to decrypt the encrypted information, when at least the second communication unit receives the encrypted information from the network, and to transmit the decrypted information to the terminal device via the first communication unit; and a switching unit configured to directly connect a communication line between the first communication unit and the terminal device to another communication line between the second communication unit and the network, when the information processing unit comes into an inoperable state including at least electric power supply stop state, and to switch into a pass-through mode in which the terminal device and the network communicate directly with each other without through the information processing unit;

wherein if a counterpart information processing device comes into the pass-through mode where the counterpart information processing device includes a first communication unit, a second communication unit, an information processing unit, and a switching unit, and where the counterpart information processing device is connected between the network and a counterpart terminal device with which the terminal device communicates via the network, then the information processing unit permits the counterpart information processing device to communicate with the counterpart terminal device in a predetermined time period on the basis of parameters related to a communication state of the counterpart information processing device and restrict the counterpart information processing device from communicating with the counterpart terminal device after the predetermined time period has elapsed.

* * * * *